United States Patent
Jin et al.

(10) Patent No.: US 9,081,395 B2
(45) Date of Patent: Jul. 14, 2015

(54) DC POWER SUPPLY APPARATUS CONFIGURED TO CORRECT INPUT POLARITY OF DC POWER

(71) Applicants: SAMSUNG ELECTRONICS CO., LTD., Suwon (KR); SUNGKYUNKWAN UNIVERSITY Research & Business Foundation, Seoul (KR)

(72) Inventors: Hyun Cheol Jin, Hwaseong-si (KR); Sun Jin Kim, Suwon (KR); Han Sol Seo, Seoul (KR); Seung Min Shin, Changwon (KR); Byoung Kuk Lee, Yongin (KR); Joon Young Jeon, Suwon (KR)

(73) Assignees: SAMSUNG ELECTRONICS CO., LTD., Suwon-Si (KR); SUNGKYUNKWAN UNIVERSITY RESEARCH & BUSINESS FOUNDATION, Seoul (KR)

( * ) Notice: Subject to any disclaimer, the term of this patent is extended or adjusted under 35 U.S.C. 154(b) by 234 days.

(21) Appl. No.: 13/755,270

(22) Filed: Jan. 31, 2013

(65) Prior Publication Data
US 2013/0200874 A1 Aug. 8, 2013

(30) Foreign Application Priority Data
Feb. 3, 2012 (KR) .......................... 10-2012-0011427

(51) Int. Cl.
G05F 1/595 (2006.01)
G05F 5/00 (2006.01)
H02H 11/00 (2006.01)

(52) U.S. Cl.
CPC ............... *G05F 5/00* (2013.01); *H02H 11/002* (2013.01)

(58) Field of Classification Search
USPC .......................... 323/299, 282–285, 288, 289
See application file for complete search history.

(56) References Cited

U.S. PATENT DOCUMENTS

| | | | | | |
|---|---|---|---|---|---|
| 5,331,323 | A | * | 7/1994 | Yamamoto | 341/136 |
| 5,617,473 | A | * | 4/1997 | Wietecha et al. | 379/399.02 |
| 5,946,205 | A | * | 8/1999 | Kawakami et al. | 363/65 |
| 6,977,827 | B2 | * | 12/2005 | Gritter | 363/40 |
| 7,184,282 | B2 | * | 2/2007 | Ohshima et al. | 363/40 |
| 7,199,528 | B2 | * | 4/2007 | Quazi | 315/247 |
| 7,638,986 | B2 | * | 12/2009 | Takeda et al. | 323/210 |
| 8,598,741 | B2 | * | 12/2013 | Kim et al. | 307/72 |
| 2001/0045853 | A1 | * | 11/2001 | Saeki | 327/233 |
| 2010/0156185 | A1 | * | 6/2010 | Kim et al. | 307/72 |
| 2013/0207621 | A1 | * | 8/2013 | Nishibori et al. | 323/205 |

* cited by examiner

Primary Examiner — Adolf Berhane
Assistant Examiner — Nusrat Quddus
(74) *Attorney, Agent, or Firm* — Staas & Halsey LLP

(57) ABSTRACT

A direct current (DC) power supply apparatus includes an input unit configured to receive an outside DC power; a plurality of polarity correction units configured to correct the polarity of the outside DC power; a plurality of switch units installed to correspond to each of the plurality of polarity correction units; a detection unit configured to detect a flow of current of the plurality of polarity correction unit; and a control unit configured to determine a polarity correction unit, at which current of DC power flows, among the plurality of correction units based on a detection signal of transmitted from the detection unit, and control the switch unit corresponding to the determined polarity correction unit at an ON position such that the current of DC power flows through the switch unit which is controlled at the ON position.

17 Claims, 35 Drawing Sheets

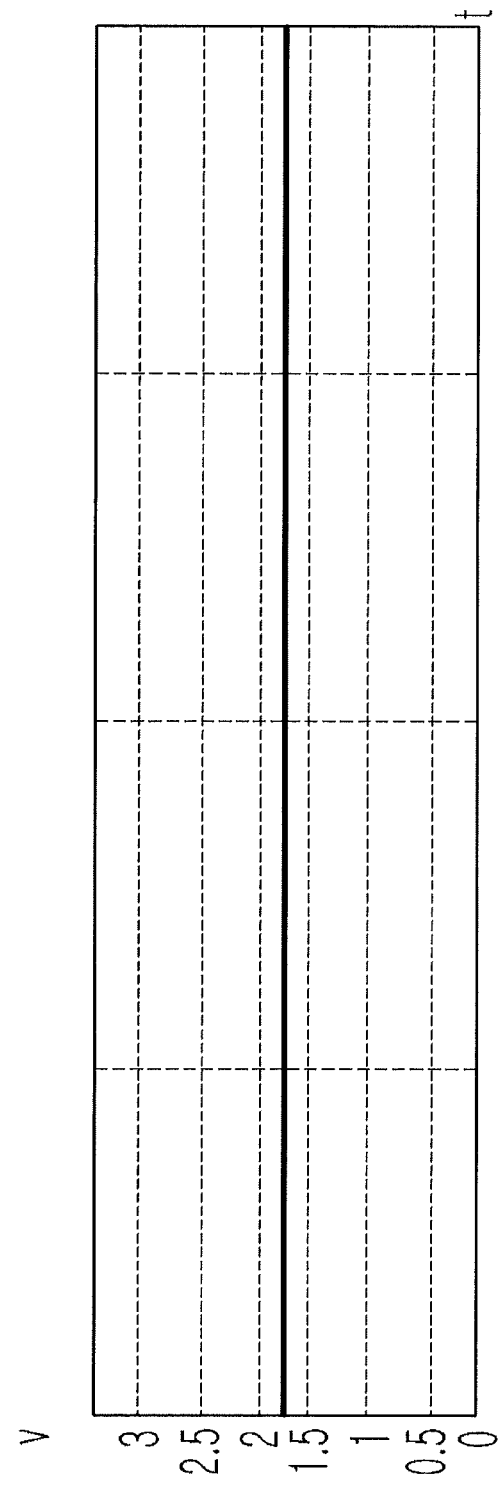
FIG. 7A – Related Art

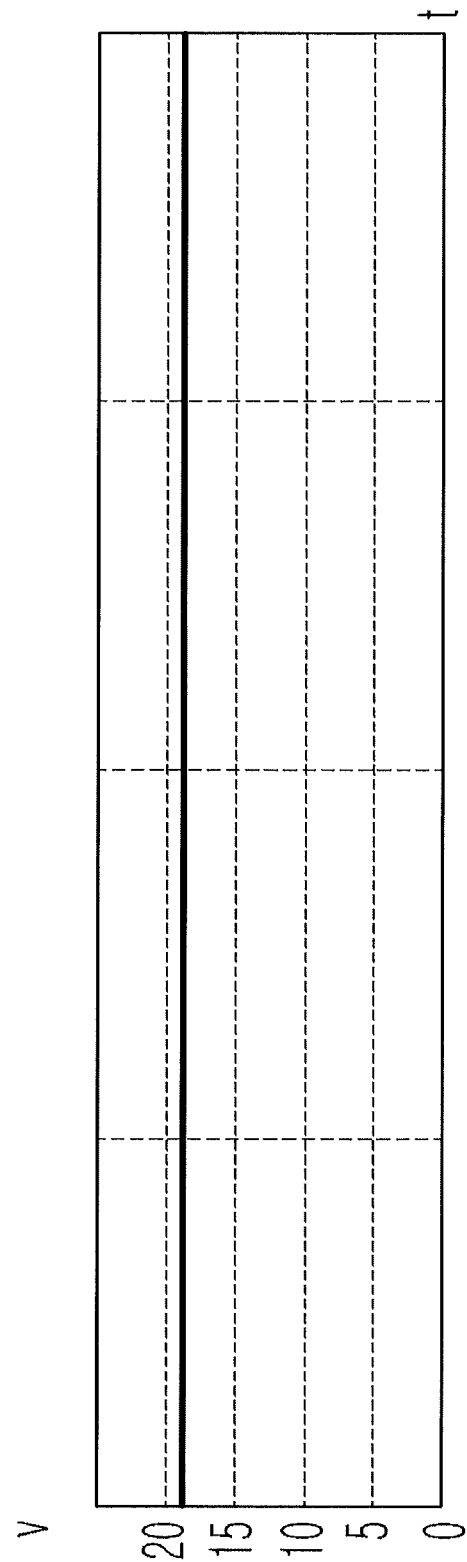
FIG. 8A – Related Art

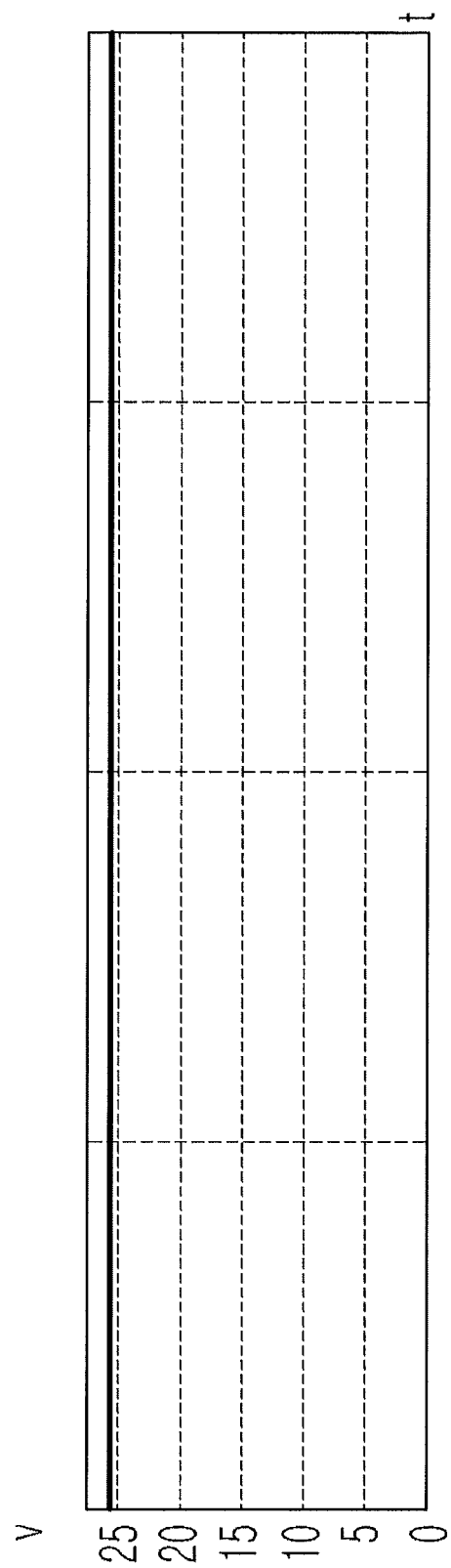
FIG. 9A – Related Art

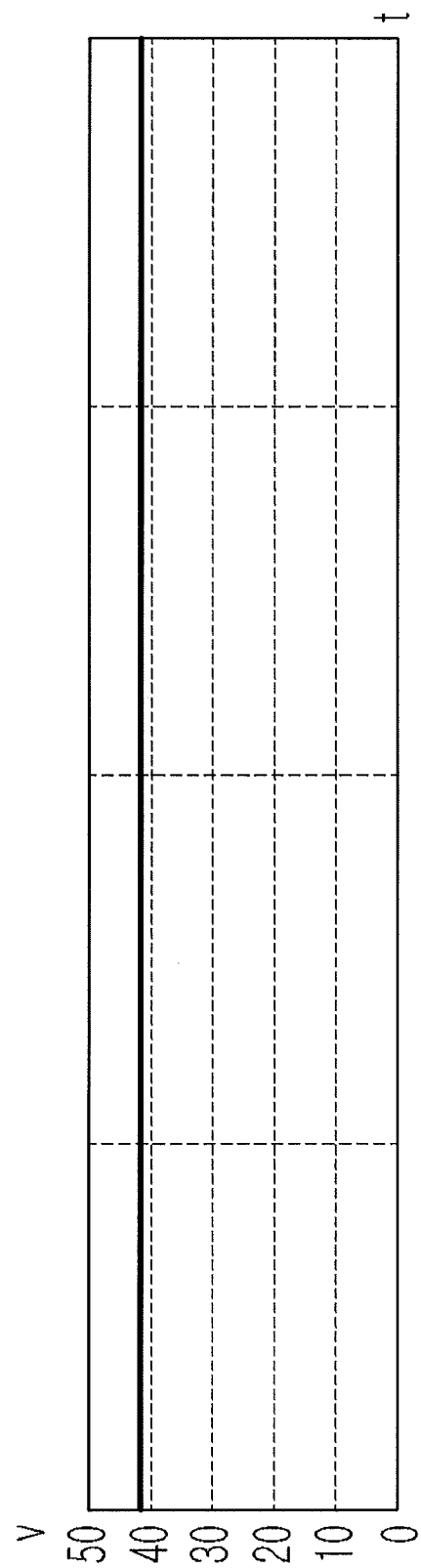
FIG. 10A – Related Art

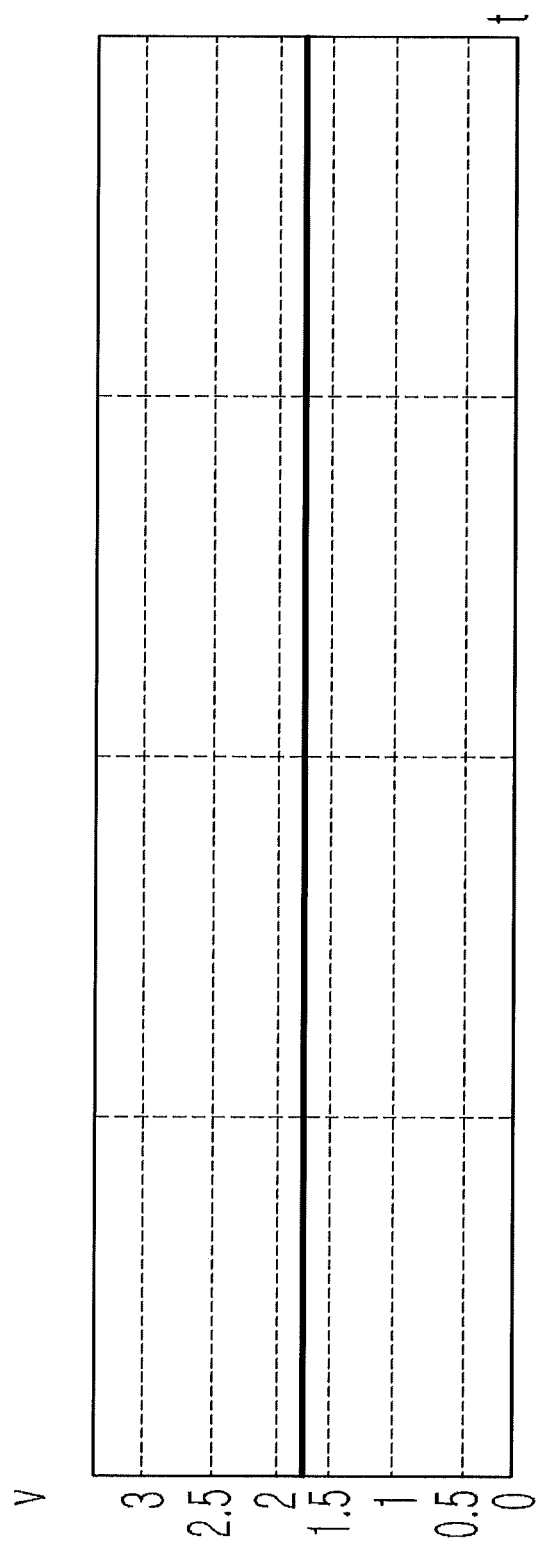
FIG. 16A – Related Art

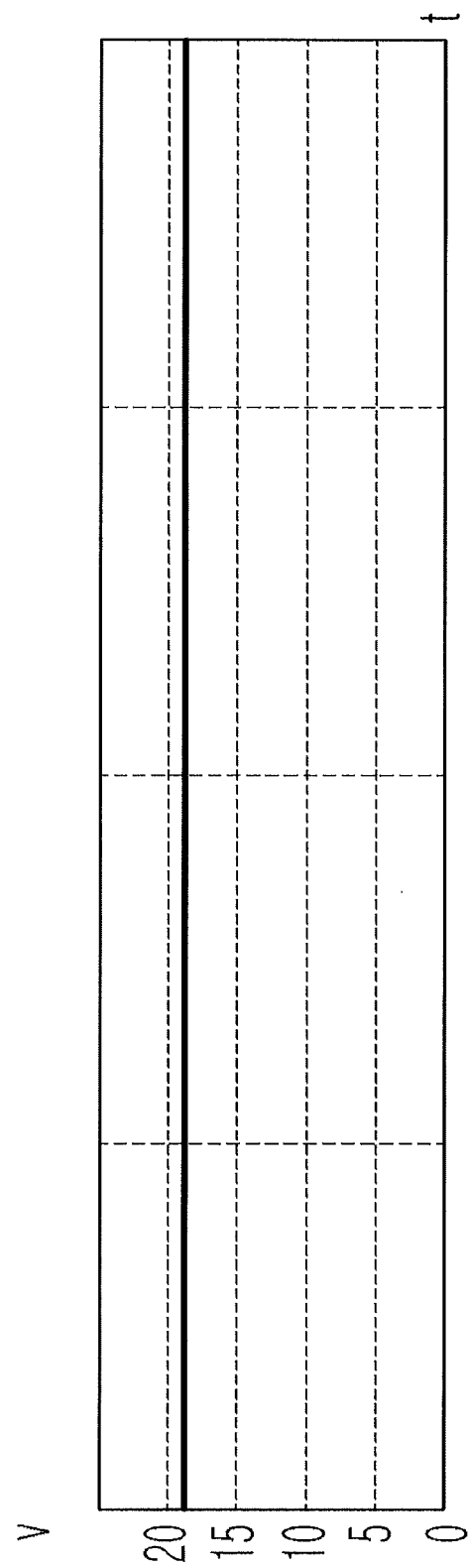
FIG. 17A – Related Art

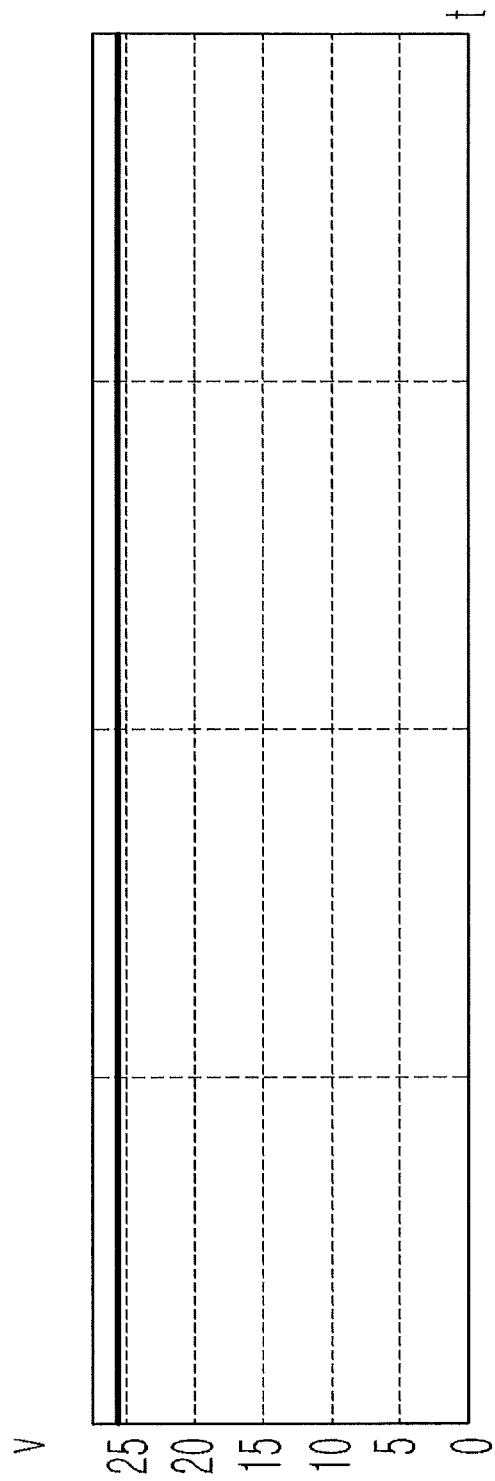
FIG. 18A – Related Art

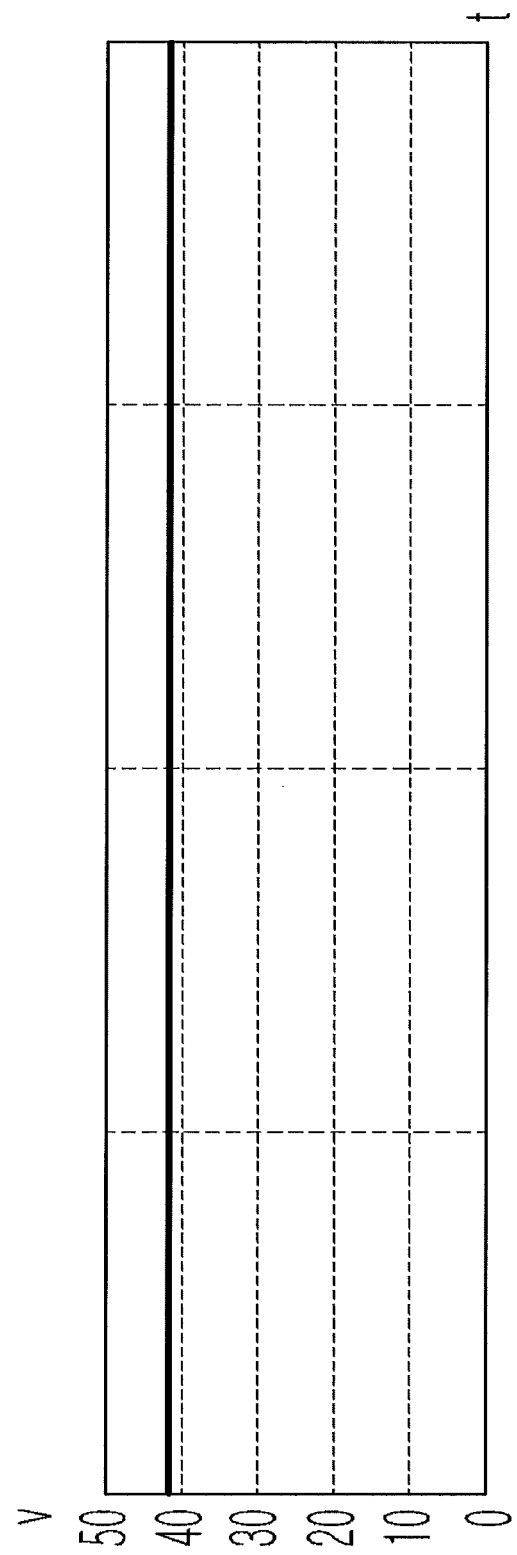
FIG. 19A – Related Art

DC POWER SUPPLY APPARATUS CONFIGURED TO CORRECT INPUT POLARITY OF DC POWER

CROSS-REFERENCE TO RELATED APPLICATIONS

This application claims the benefit of Korean Patent Application No. 10-2012-0011427, filed on Feb. 3, 2012 in the Korean Intellectual Property Office, the disclosure of which is incorporated herein by reference.

BACKGROUND

1. Field

Embodiments of the present disclosure relate to a DC power supply apparatus configured to correct an input polarity of a DC power.

2. Description of the Related Art

A DC power supply apparatus originated from a digital apparatus and an Internet data center (IDC), due to an increasing efficiency as a result of a declining power conversion process, an easy link with an uninterrupted power supply apparatus, and an efficient link with new regeneration energy and a charging system for electric vehicles, is being considered for expansion for household use.

As such, the DC power supply apparatus having a direct current as input power is required to be exactly connected with a positive (+) end and a negative (−) end at an input of the commercial power supply.

If the polarity of the DC power supply apparatus connected to the input of the commercial power supply is changed, not only the load may fail to operate, but also the DC power supply apparatus may burn out.

That is, since most electronic devices are equipped with an electrolytic capacitor at the input of the power supply apparatus, and such electrolytic capacitor is at risk of damage or explosion when the power having a reverse polarity is applied to the electrolytic capacity, it is imperative to determine the exact input polarity particularly when the supply of the DC power is introduced for household use.

Conventionally, by disposing a diode rectifier, which is provided with the total of four diodes coupled together in the form of a bridge, between the input of the commercial power supply and the power supply apparatus of the load, the voltage having the bipolarity is applied to the electrolytic capacitor, that is the DC link, thereby preventing the electrolytic capacitor and the load from being influenced by the polarity of the commercial power supply.

That is, the diode rectifier, when applied to the AC power supply apparatus, allows the bipolarity to be applied to the electrolytic capacitor even in a case when the AC voltage is alternately applied, and the diode rectifiers applied to the DC power supply apparatus may correct the input polarity with respect to the inputs of both the positive (+) polarity and the negative (−) polarity.

In a case when the input polarity is to be corrected by using the diode rectifier, however, since two diodes in the diode rectifier are conducted at all times, a loss caused by a drop of the voltage of the diode and a loss caused by an internal resistance of the diode occur.

That is, the diode rectifier having 600V of a rated voltage, which may generally be used at the DC power supply of 380V, normally shows a voltage drop in a range between 1.0V and 1.3V.

As an example, in a case when the internal resistance of the diode is not considered while assuming that the voltage drop occurs at about 1.1V, the maximum loss of power that may occur at a drum type washing machine having a capacity of 3.65 kW is about 42.96 W.

As such, in a case when correcting a polarity using the diode rectifier, the overall efficiency of an electronic device may be reduced. In particular, the correcting of a polarity using the diode rectifier may cause inefficient power consumption of a battery of a mobile digital device, and furthermore, may decrease the overall performance of the mobile digital device.

SUMMARY

Therefore, it is an aspect of the present disclosure to provide a DC power supply apparatus configured to determine a polarity correction unit, at which the current of the DC power flows, among a plurality of polarity correction units, switch on a switch unit corresponding to the determined polarity correction unit, and allow the current flowing through the determined polarity correction unit to flow through the switch unit which is turned on.

It is another aspect of the present disclosure to provide a DC power supply apparatus configured to change the path of a current by using a semiconductor switch.

It is another aspect of the present disclosure to provide a DC power supply apparatus configured to change the path of a current by using a relay.

Additional aspects of the disclosure will be set forth in part in the description which follows and, in part, will be apparent from the description, or may be learned by practice of the disclosure.

In accordance with one aspect of the present disclosure, a direct current (DC) power supply apparatus includes an input unit, a plurality of polarity correction units, a plurality of switch units, a detection unit and a control unit. The input unit may be configured to receive a DC power of an outside. The plurality of polarity correction units may be configured to correct the polarity of the DC power of the outside. The plurality of switch units may be installed while corresponding to each of the plurality of polarity correction units. The detection unit may be configured to detect a flow of current of the plurality of polarity correction unit. The control unit may be configured to determine a polarity correction unit, at which current of DC power flows, among the plurality of correction units based on a detection signal of transmitted from the detection unit, and control the switch unit corresponding to the determined polarity correction unit at the ON position such that the current of DC power flows through the switch unit which is controlled at the ON position.

The plurality of polarity correction units may include a plurality of diodes. The plurality of switch units may include a plurality of metal-oxide semiconductor field-effect transistors (MOSFET).

The diode may be connected in parallel to the MOSFET.

The input unit may include a first terminal and a second terminal each provided with an input polarity of DC power established.

The plurality of polarity correction units may include a first polarity correction unit and a second polarity correction unit. The first polarity correction unit may be configured to flow current therethrough when the DC powers of the input polarities each established for the first terminal and the second terminal are input into the first terminal and the second terminal, respectively. The second polarity correction unit may be configured to flow current therethrough when DC powers of input polarities different from the input polarities established for the first terminal and the second terminal are input into the first terminal and the second terminal, respectively.

The plurality of switch units may include a first switch unit and a second switch unit. The first switch unit may be connected in parallel to the first polarity correction unit. The second switch unit may be connected in parallel to the second polarity correction unit.

The detection unit may include a first polarity detection unit and a second polarity detection unit. The first polarity detection unit may be configured to detect the flow of current of the first polarity correction unit. The second polarity detection unit may be configured to detect the flow of current of the second polarity correction unit.

The first polarity detection unit may include a first voltage distribution unit, and a first comparison unit. The first voltage distribution unit may be configured to distribute a voltage at both ends of the first polarity correction unit. The first comparison unit may be configured to compare the voltage distributed at the first voltage distribution unit with a first reference voltage. The second polarity detection unit may include a second voltage distribution unit, and a second comparison unit. The second voltage distribution unit may be configured to distribute a voltage at both ends of the second polarity correction unit. The second comparison unit may be configured to compare the voltage distributed at the second voltage distribution unit with a second reference voltage. The control unit, based on detection signals transmitted from the first comparison unit and the second comparison unit, may determine a polarity correction unit, at which current flows, between the first polarity correction unit and the second polarity correction unit.

The control unit may be configured to control the first switch unit at the ON position if determined that current flows at the first polarity correction unit, and control the second switch unit at the ON position if determined that current flows at the second polarity correction unit, thereby changing a current flow from flowing through the first and second polarity correction units to flowing through the first and second switch units.

The detection unit may include a voltage distribution unit and a comparison unit. The voltage distribution unit may be connected in parallel to at least one of the plurality of polarity correction units to distribute the voltage of both ends of the at least one polarity correction unit. The comparison unit may be configured to compare the distributed voltage with a reference voltage. The control unit may determine, based on a detection signal transmitted from the comparison unit, a polarity correction unit, at which current flows, among the plurality of polarity correction units.

The voltage distribution unit may include a distribution resistor.

The DC power supply apparatus may further include a DC link unit configured to smoothen a DC power that is corrected at the plurality of polarity correction units.

The plurality of polarity correction units may include a plurality of diodes. The plurality of switch units may include a plurality of relays.

The DC power supply apparatus may further include a resistor connected between the input unit and the plurality of diodes to limit inrush current.

The plurality of polarity correction units may include a first diode and a second diode, and a third diode and a fourth diode. The first diode and the second diode may be configured to form a first current path at which current flows when DC powers of input polarities each established for a first terminal and a second terminal of the input unit are input into the first terminal and the second terminal, respectively. The third diode and the fourth diode may be configured to form a second current path at which current flows when DC powers of input polarities different from the input polarities each established for the first terminal and the second terminal are input into the first terminal and the second terminal, respectively. The plurality of switch units may include a first relay and a second relay, and a third relay and a fourth relay. The first relay and the second relay may be connected in parallel to the first diode and the second diode, respectively, and configured to reform the first current path. The third relay and the fourth relay may be connected in parallel to the third diode and the fourth diode, respectively, and configured to reform the second current path. The control unit, based on the detection signal of the detection unit, may determine a current path between the first current path and the second current path, which is formed, and may reform the formed current path by controlling the relay that corresponds to the determined current path at the ON position.

The first relay may be connected between the first terminal and a load, the second relay may be connected between the second terminal and a ground, the third relay may be connected between the first terminal and a ground, and the fourth relay may be connected between the second terminal and the load.

In accordance with another aspect of the present disclosure, a direct current (DC) power supply apparatus includes an input unit, a switch unit, a polarity correction unit, a detection unit, and a control unit. The input unit may be configured to receive a DC power of outside. The switch unit may be connected to the DC power of outside and configured to convey the DC power of outside to a load. The polarity correction unit may be connected in parallel to the switch unit. The detection unit may be configured to detect a flow of current of the polarity correction unit. The control unit may be configured to control the switch unit at the ON position such that a flow of current of DC power is changed from flowing through the polarity correction unit to flowing through the switch unit when a detection signal is transmitted from the detection unit.

The plurality of polarity correction units may include a plurality of diodes, the plurality of switch units may include a plurality of metal-oxide semiconductor field-effect transistors (MOSFET), and each of the plurality of diodes may be connected in parallel to each of the plurality of the MOSFETs.

The polarity correction unit may include a first polarity correction unit and a second polarity correction unit. The first polarity correction unit may be configured to flow current therethrough when DC powers of input polarities each established for a first terminal and a second terminal of the input unit are input to the first terminal and the second terminal, respectively. The second polarity correction unit may be configured to flow current therethrough when DC powers of input polarities different from the input polarities each established for the first terminal and the second terminal are input into the first terminal and the second terminal, respectively. The detection unit may include a first polarity detection unit and a second polarity detection unit. The first polarity detection unit may be configured to detect a current flow of the first polarity correction unit. The second polarity detection unit may be configured to detect a current flow of the second polarity correction unit. The control unit may control a first switch unit corresponding to the first polarity correction unit at the ON position when a detection signal is transmitted from the first polarity detection unit, and control a second switch unit corresponding to the second polarity correction unit at the ON position when a detection signal is transmitted from the second polarity detection unit.

The first polarity detection unit may include a first voltage distribution unit and a first comparison unit. The first voltage distribution unit may be configured to distribute a voltage at both ends of the first polarity correction unit. The first comparison unit may be configured to compare the voltage distributed from the first voltage distribution unit with a first reference voltage. The second polarity detection unit may include a second voltage distribution unit and a second comparison unit. The second voltage distribution unit may be configured to distribute a voltage at both ends of the second polarity correction unit. The second comparison unit may be configured to compare the voltage distributed from the second voltage distribution unit with a second reference voltage.

In accordance with another aspect of the present disclosure, a direct current (DC) power supply apparatus includes an input unit, a polarity correction unit, a plurality of switch units, a detection unit and a control unit. The input unit may include a first terminal and a second terminal each having an input polarity thereof established, the input unit configured to receive a DC power of outside through the first terminal and the second terminal. The polarity correction unit may be configured, if DC powers of input polarities each established for the first terminal and the second terminal are input into the first terminal and the second terminal, to form a first current path between the DC power of outside and a load, and if DC powers of input polarities different from the input polarities each established for the first terminal and the second terminal are input into the first terminal and the second terminal, configured to form a second current path between the DC power of outside and the load such that the input polarity of the DC power is corrected. The plurality of switch units may be provided on the first current path and the second current path, and may be configured to convey the DC power of outside to the load. The detection unit may be configured to detect a flow of current of each of the first current path and the second current path. The control unit, based on a signal transmitted from the detection unit, may be configured to determine a current path, which is formed, between the first current path and the second current path, and configured to change a flow of current from flowing through the polarity correction unit to flowing from the switch unit by controlling the switch unit, which is positioned at the determined current path at the ON position.

As described above, by changing the current path depending on the polarities of the DC powers connected to the first terminal and the second terminal, respectively, the DC power having a normal polarity may be applied to the load, even when the DC powers of the polarities, which are different from the polarities established for the first terminal and the second terminal, are applied to the first terminal and the second terminal.

As the above, safety and efficiency of the electronic device having the DC power as an input may be increased, and also, reliability of the electronic device may be retained.

In addition, when the DC power of outside is applied to the load, the DC power is applied through the diode and then the switch unit is operated at the ON position such that the DC power is applied through the switch unit, thereby reducing the loss caused by the voltage drop of the diode and the loss caused by an internal resistance of the diode, and therefore, the power loss of the electronic device may be reduced.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 7A to 10B each illustrate a graph of power loss of a washing machine applied with the DC power supply apparatus in accordance with the embodiment of the present disclosure and a graph of power loss of a washing machine applied with a conventional DC power supply apparatus.

FIGS. 16A to 19B illustrate a power loss graph of a washing machine applied with the DC power supply apparatus in accordance with the other embodiment of the present disclosure and a power loss graph of a washing machine applied with a conventional DC power supply apparatus.

DETAILED DESCRIPTION

Figure 1:
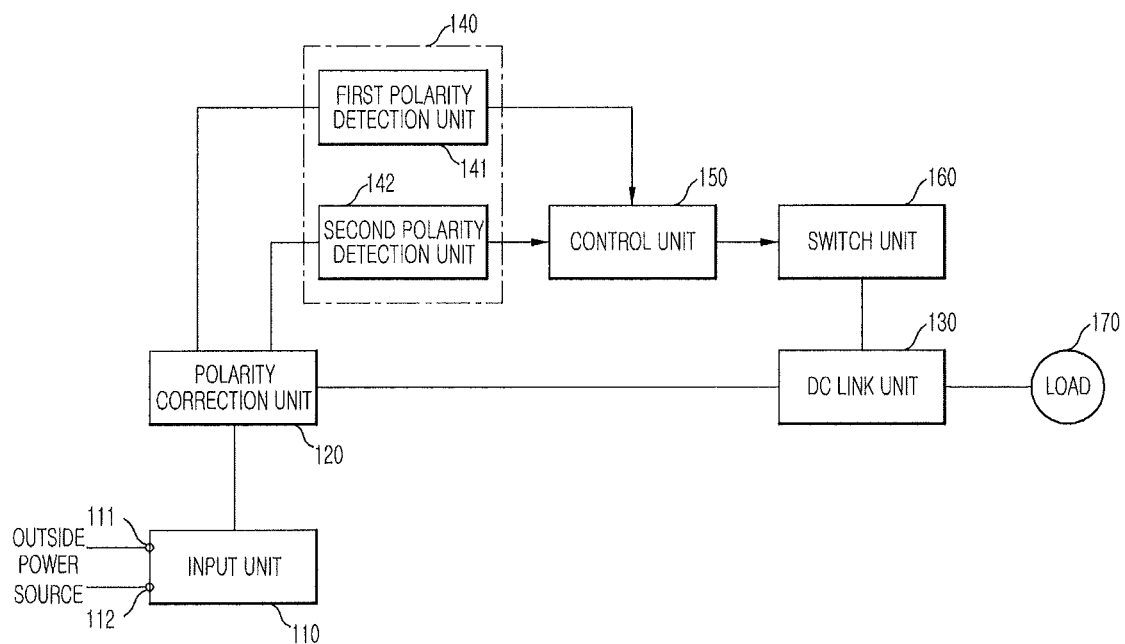
FIG. 1 is a block diagram illustrating a DC power supply apparatus in accordance with one embodiment of the present disclosure.

Reference will now be made in detail to the embodiments of the present disclosure, examples of which are illustrated in the accompanying drawings, wherein like reference numerals refer to like elements throughout.

FIG. 1 is a block diagram illustrating a DC power supply apparatus in accordance with one embodiment of the present disclosure. The DC power supply apparatus configured to supply a DC power to a load 170 includes an input unit 110, a polarity correction unit 120, a DC link unit 130, a detection unit 140, a control unit 150, and a switch unit 160.

The DC power supply apparatus may further include a resistor configured to prevent an excess current from flowing at the polarity correction unit 120 and the DC link unit 130.

The input unit 110 is connected to DC power source terminals of outside to receive a DC power of outside, and conveys the DC power input to the load 170.

Such an input unit 110 includes a first terminal 111 and a second terminal 112 that are connected to a positive (+) terminal among the DC power source terminals of outside, at which a positive (+) voltage is input, and a negative (−) terminal among the DC power source terminals of outside, at which a negative (−) voltage is input.

As such, each of the first terminal 111 and the second terminal 112 is provided with a predetermined polarity of the DC power that is to be entered.

In addition, the load 170 is provided with two terminals into which DC power is input, and each of the two terminals is also provided with a predetermined polarity of the DC power.

Through a circuit, the first terminal 111 and the positive (+) terminal of the load 170 are connected to each other, and the second terminal 112 and the negative (−) terminal of the load 170 are connected to each other.

Through such, in a case when the first terminal 111 and the second terminal 112 are normally connected to the outside DC power source terminal, current flows from the first terminal 111 to the second terminal 112 and the DC power is normally applied to the load 170.

However, in a case when the first terminal 111 and the second terminal 112 are abnormally connected to the outside DC power source terminal, that is, when the first terminal 111 is connected to the negative (−) terminal and the second terminal 112 is connected to the positive (+) terminal, current flows from the second terminal 112 to the first terminal 111.

At this time, the DC powers of polarities opposite to the polarities established for the two terminals are applied to the two terminals, and the load 170 either stops operation or breaks down as a result.

In such case, the DC power supply apparatus, in order to prevent the breakdown of the load 170 and to facilitate a normal operation, is needed to correct the polarity of the DC power that flows from the input unit 110 to the load 170.

The polarity correction unit 120 is connected to the input unit 110 and the switch unit 160 in a parallel manner between the input unit 110 and the switch unit 160, and when the outside DC power is input to the polarity correction unit 120 through the input unit 110, the polarity correction unit 120 corrects the polarity of the DC power, and supplies the DC power having the polarity corrected to the load 170.

Such a polarity correction unit 120, when a certain time is expired after the DC power of outside is input thereto, forms an open circuit between the input unit 110 and the load 170. Through such, the flow of a current through the polarity correction unit 120 is cut off.

Such cutoff occurs as the flow of a current is changed from flowing through the polarity correction unit 120 to flowing through the switch unit 160.

The polarity correction unit 120 includes a first polarity correction unit 121, and a second polarity correction unit 122. The first polarity correction unit 121 may be configured to maintain the respective polarities of the first terminal 111 and the second terminal 112 in a case when the polarity of the first terminal 111 and the polarity of the second terminal 112 are normally connected. The second polarity correction unit 122 is configured to correct the polarities of the first terminal 111 and the second terminal 112 in a case when the polarity of the first terminal 111 and the polarity of the second terminal 112 are abnormally connected.

Here, the first polarity correction unit 121, in a case when the polarities are normally connected, forms a first current path between the input unit 110 and the load 170, and the second polarity correction unit 122, in a case when the polarities are abnormally connected, forms a second current path between the input unit 110 and the load 170.

Such a polarity correction unit 120 includes a plurality of diodes (from D1 to D4). Such a plurality of diodes is formed with a bridge diode.

The DC link unit 130 is supplied with the DC power through the polarity correction unit 120 or the switch unit 160.

The DC link unit, after smoothing the supplied DC power, conveys the DC power that is smoothed to the load 170. The DC link unit 130 includes a capacitor C.

The capacitor C is connected to the input unit 110 and the load 170 in a parallel manner between the input unit 110 and the load 170.

The detection unit 140 detects the current flow of the polarity correction unit 120. By detecting the current flow of the polarity correction unit 120, it may be determined whether the polarity connection of the first terminal 111 and the second terminal 112 of the input unit 110 is normal or abnormal.

More in particular, the detection unit 140 includes a first polarity detection unit 141 connected to the first polarity correction unit 121 and a second polarity detection unit 142 connected to the second polarity detection unit 122.

Here, the first polarity detection unit 141 includes a plurality of resistors R1 and R2 each connected in parallel to both ends of the first polarity correction unit 121, and the second polarity detection unit 142 includes a plurality of resistors R3 and R4 each connected in parallel to both ends of the second polarity correction unit 122.

The first polarity detection unit 141 detects the distribution voltage between the both ends of the first polarity correction unit 121, and the second polarity detection unit 142 detects the distribution voltage between the both ends of the second polarity correction unit 122.

More particularly, the first detection unit 141, when a current flows at the first polarity correction unit 121, detects the distribution voltage that corresponds to the voltage at both ends of the diode of the first polarity correction unit 121. The first detection unit 141, when a current does not flow at the first polarity correction unit 121, detects the distribution voltage that corresponds to the voltage at both ends of the input unit 110 as the diode of the first polarity correction unit 121 is open.

In the same manner as the above, the second detection unit 142, when a current flows at the second polarity correction unit 122, detects the distribution voltage that corresponds to the voltage at both ends of the diode of the second polarity correction unit 122. The second detection unit 142, when a current does not flow at the second polarity correction unit 122, detects the distribution voltage that corresponds to the voltage at both ends of the input unit 110 as the diode of the second polarity correction unit 122 is open.

The first polarity detection unit 141 further includes a first comparison unit Com 1, and the second polarity detection unit 142 further includes a second comparison unit Com 2.

More in particular, the first comparison unit Com1 of the first polarity detection unit 141 compares the distribution voltage detected with a first reference voltage Vr1, and outputs a high signal as a detected signal when the distribution voltage is above the first reference voltage, and outputs a low signal as a detected signal when the distribution voltage is below the first reference voltage.

In the same manner as the above, the second comparison unit Com2 of the second polarity detection unit 142 compares the distribution voltage detected with a second reference voltage Vr2, and outputs a high signal as a detected signal when the distribution voltage is above the second reference voltage, and outputs a low signal as a detected signal when the distribution voltage is below the second reference voltage.

The first polarity detection unit 141, since the distribution voltage that corresponds to the voltage between the both ends of the diode is detected in a case when a current flows through the first polarity correction unit 121, outputs a low signal. The first polarity detection unit 141, since the distribution voltage that corresponds to the voltage between the both ends of the input unit 110 is detected in a case when a current flows through the second polarity correction unit 122, outputs a high signal.

In the same manner as the above, the second polarity detection unit 142, since the distribution voltage that corresponds to the voltage between the both ends of the diode is detected in a case when a current flows through the second polarity correction unit 122, outputs a low signal. The second polarity detection unit 142, since the distribution voltage that corresponds to the voltage between the both ends of the input unit 110 is detected in a case when a current flows through the first polarity correction unit 121, outputs a high signal.

That is, the first polarity detection unit 141 and the second polarity detection unit 142 detect at which one of the first current path formed by the current flow of the first polarity correction unit 121 and the second current path formed by the current flow of the second polarity correction unit 122 the DC current flows.

The control unit 150 determines that the first current path is formed, if the low signal is input from the first polarity detection unit 141, and controls a first switch unit 161 at the ON position. The control unit 150 determines that the second current path is formed when the low signal is input from the second polarity detection unit 142, and controls a second switch unit 162 at the ON position.

The control unit 150, when the high signal is input from the second polarity detection unit 142, may control the first switch unit 161 at the ON position, and when the high signal is input from the first polarity detection unit 141, may control the second switch unit 162 at the ON position.

The current path of the DC power flowing from the input unit 110 to the load 170 through the polarity detection unit 140 is hereby changed so that the current path of the DC power supply flows from the input unit 110 to the load 170 through the switch unit 160.

The DC power supply apparatus as above, when being supplied with the DC power through the DC power source terminal of outside, is supplied through the polarity correction unit 120 at first, but after a certain time is expired, is supplied with the DC power through the switch unit 160.

Since the DC power is being supplied through the diode only at the time of the initial connection of the DC power supply apparatus to the DC power source terminal of outside, a power loss caused by the diode may be minimized.

The switch unit 160 is connected in parallel to the polarity correction unit 120.

The switch unit 160 includes the first switch unit 161 and the second switch unit 162. The first switch unit 161, in a case when the polarity of the first terminal 111 and the polarity of the second terminal 112 are normally connected, is configured to maintain the respective polarities, and the second switch unit 162, in a case when the polarity of the first terminal 111 and the polarity of the second terminal 112 are abnormally connected, is configured to correct the polarities.

Here, the first switch unit 161, in a case when the polarities are normally connected, reforms the first current path between the input unit 110 and the load 170. The second switch unit 162, in a case when the polarities are abnormally connected, reforms the second current path between the input unit 110 and the load 170.

The first switch unit 161 and the second switch unit 162 operate at the ON or OFF position according to the command of the control unit 150. At this time, the current path changes from flowing through the polarity correction unit 120 to flowing through the switch unit 160 that is operated at the ON position.

The switch unit 160 includes a plurality of switches. Here the switch includes a semiconductor switch or a relay.

Here, in a case when the switch unit 160 is formed of the semiconductor switch formed thereof, the switch unit 160 may be integrally formed with the polarity correction unit 120.

At this time, one metal oxide-semiconductor field-effect transistor (MOSFET) is formed with one switch and one diode connected in parallel to the one switch, and as the MOSFET is provided in plurality, a plurality of switch units and polarity correction units are formed.

First, the following description in accordance with one embodiment of the present disclosure will be made in relation that the switch unit 160 and the polarity correction unit 120 are formed with the plurality of MOSFETs.

Figure 2:
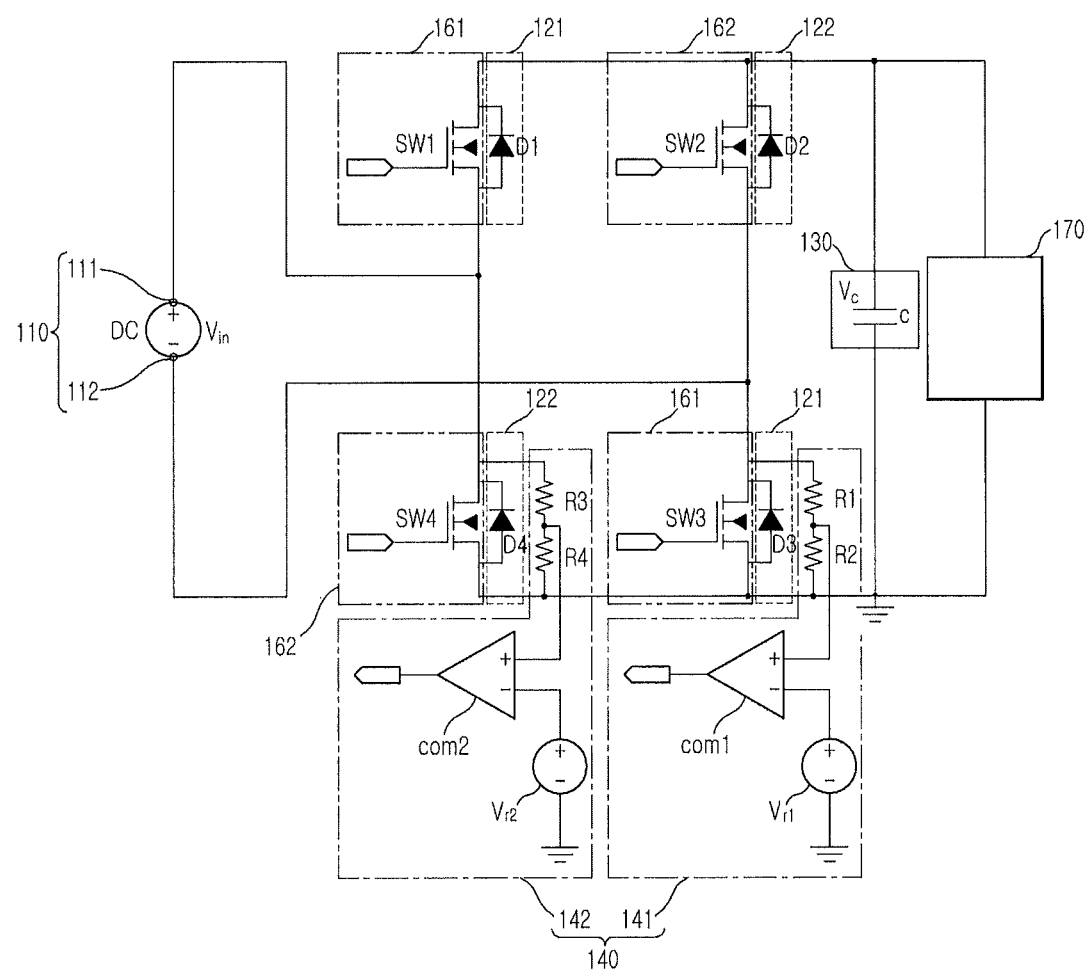
FIG. 2 is a circuit diagram illustrating the DC power supply apparatus in accordance with the embodiment of the present disclosure.

FIG. 2 is a circuit diagram illustrating the DC power supply apparatus in accordance with the embodiment of the present disclosure.

The DC power supply apparatus includes the input unit 110 connected to the DC power source terminals of outside.

Here, the input unit 110 includes the first terminal 111 connected to the voltage terminal having a positive (+) polarity among the DC power source terminals of outside, and the second terminal 112 connected to the voltage terminal having a negative (−) polarity among the DC power source terminals of outside. The input unit 110 is supplied with a DC power of outside Vin through the first terminal 111 and the second terminal 112.

The DC power supply apparatus includes the first switch unit 161 and the first polarity correction unit 121 that are configured to form the first current path between the input unit 110 and the load 170, and the second switch unit 162 and the second polarity correction unit 122 that are configured to form the second current path between the input unit 110 and the load 170.

Here, the first switch unit 161 and the first polarity correction unit 121 include a first MOSFET SW1 and D1 and a third MOSFET SW3 and D3. The second switch unit 162 and the second polarity correction unit 122 include a second MOSFET SW2 and D2 and a fourth MOSFET SW4 and D4.

More in particular, the first MOSFET includes a first switch SW1 provided with a source thereof connected to the first terminal 111 of the input unit 110 and with a drain thereof connected to the load 170, and a first diode D1 connected in parallel to the source and the drain of the first switch SW1.

At this time, an anode of the first diode D1 is connected to the source of the first switch SW1, and a cathode of the first diode D1 is connected to the drain of the first switch SW1.

The second MOSFET includes a second switch SW2 provided with a drain thereof connected between the drain of the first MOSFET and the load 170 and with a source thereof connected to the second terminal 112, and a second diode D2 connected in parallel to the source and the drain of the second switch SW2.

At this time, an anode of the second diode D2 is connected to the source of the second switch SW2, and a cathode of the second diode D2 is connected to the drain of the second switch SW2.

The third MOSFET includes a third switch SW3 provided with a drain thereof connected to the source of the second switch SW2 and to the second terminal 112 of the input unit 110 and with a source thereof connected to a ground, and a third diode D3 connected in parallel to the source and the drain of the third switch SW3.

At this time, an anode of the third diode D3 is connected to the source of the third switch SW3, and a cathode of the third diode D3 is connected to the drain of the third switch SW3.

The fourth MOSFET includes a fourth switch SW4 provided with a drain thereof connected to the source of the first switch SW1 and to the first terminal 111 of the input unit 110 and with a source thereof connected to a ground, and a fourth diode D4 connected in parallel to the source and the drain of the fourth switch SW4.

At this time, an anode of the fourth diode D4 is connected to the source of the fourth switch SW4, and a cathode of the fourth diode D4 is connected to the drain of the fourth switch SW4.

Here, the diodes from the first diode to the fourth diode are the body diodes of the first switch to the fourth switch.

Each gate of the plurality of the MOSFETs is connected to the control unit 150, and is input with an ON/OFF command from the control unit 150.

The DC power supply apparatus includes a capacitor C connected between the drains of the first switch SW1 and the second switch SW2, and the sources of the third switch SW3 and the fourth switch SW4.

That is, the capacitor C is connected in parallel between the plurality of MOSFETs and the load.

The load 170 is connected in parallel to the both ends of the capacitor C.

The DC power supply apparatus further includes the first polarity detection unit 141 connected to the first polarity correction unit 161 and the second polarity detection unit 142 connected to the second polarity correction unit 162.

The first polarity detection unit 141 includes a first voltage distribution unit R1 and R2 connected in parallel to the both ends of the third diode D3, which is provided at the third MOSFET of the first switch unit 161, and the first comparison unit com1 connected between the first resistor R1 and the second resistor R2, both of which correspond to the first voltage distribution unit.

The cathode of the third diode D3 is connected to the first resistor that corresponds to the first voltage distribution unit, and also, the second terminal 122 is connected to the first resistor. The anode of the third diode D3 is connected to the second resistor, and also the ground is connected to the second resistor.

The first comparison unit com1 is input with the first distribution voltage from the first distribution resistor therein through the positive (+) terminal, and is input with the first reference voltage Vr1 therein through the negative (−) terminal. The first comparison unit com1 compares the first distribution voltage with the first reference voltage, and in a case when the first distribution voltage is above the first reference voltage, the first comparison unit com1 outputs a high signal, and in a case when the first distribution voltage is below the first reference voltage, the first comparison unit com1 outputs a low signal.

At this time, the first comparison unit com1 outputs the high signal or the low signal, both of which are the detection signals, to the control unit 150.

The second polarity detection unit 142 includes a second voltage distribution unit R3 and R4 connected in parallel to the both ends of the fourth diode D4, which is provided at the fourth MOSFET of the second switch unit 162, and the second comparison unit com2 connected between the third resistor R3 and the fourth resistor R4, both of which correspond to the second voltage distribution unit.

The cathode of the fourth diode D4 is connected to the third resistor of the second voltage distribution unit, and also the first terminal 121 is connected to the third resistor. The anode of the fourth diode D4 is connected to the fourth resistor, and also the ground is connected to the fourth resistor.

The second comparison unit com2 is input with the second distribution voltage from the second distribution resistor therein through the positive (+) terminal, and is input with the second reference voltage Vr2 therein through the negative (−) terminal. The second comparison unit com2 compares the second distribution voltage with the second reference voltage, and in a case when the second distribution voltage is above the second reference voltage, the second comparison unit com2 outputs a high signal, and in a case when the second distribution voltage is below the second reference voltage, the second comparison unit com1 outputs a low signal.

At this time, the second comparison unit com2 outputs the high signal or the low signal, both of which are the detection signals, to the control unit 150.

The control unit 150, by using the signal that is output from the first comparison unit com1 and the second comparison unit com2, may determine the polarity connected to at least one of the first terminal and the second terminal of the input unit 110.

That is, the distribution resistor which is connected in parallel to the diode that does not form a current path, forms a closed circuit between the input unit and the ground. Based on the above, the polarity connected to at least one of the first terminal and the second terminal may be determined by using the distribution voltage detected through the distribution resistor.

At this time, the control unit 150, in a case when a low signal is output from the first comparison unit, may determine that the voltage terminal having a positive (+) polarity is connected to the first terminal. The control unit 150, in a case when a low signal is output from the second comparison unit, may determine that the voltage terminal having a negative (−) polarity is connected to the second terminal.

Referring to FIGS. 3A to 6B, the current flow of the DC power supply apparatus which is formed as the above will be explained.

Figure 3A:
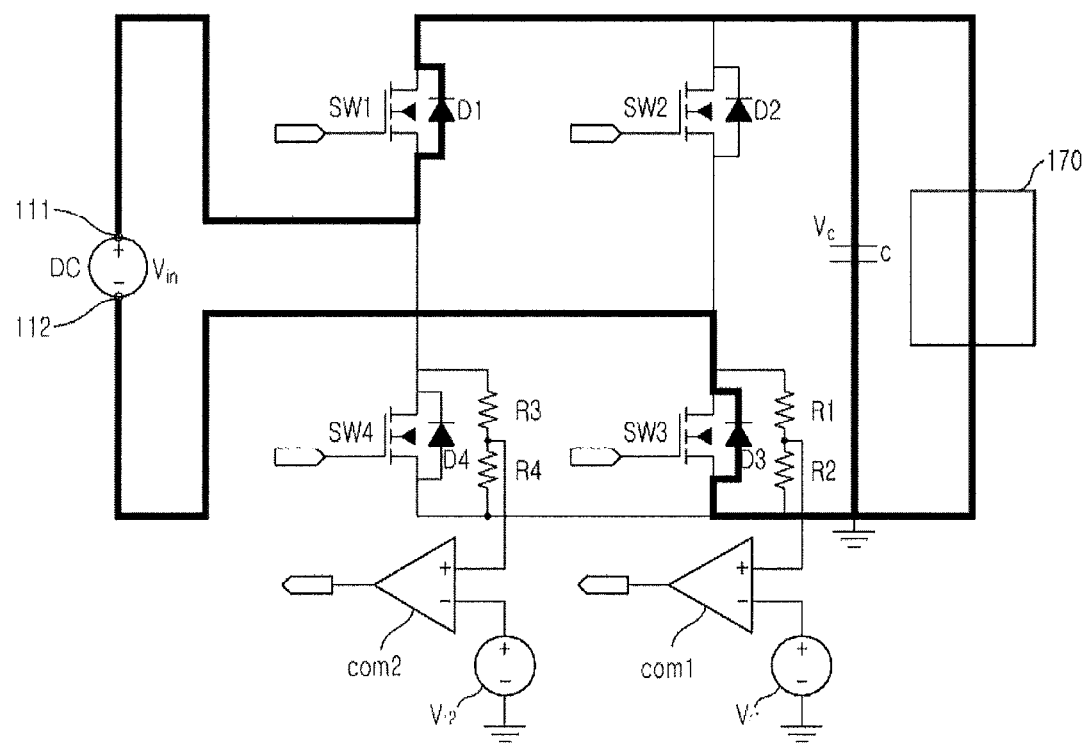
FIGS. 3A and 3B illustrates the current flow at the time of applying a DC power having a normal polarity to the DC power supply apparatus in accordance with the embodiment of the present disclosure.
Figure 3B:
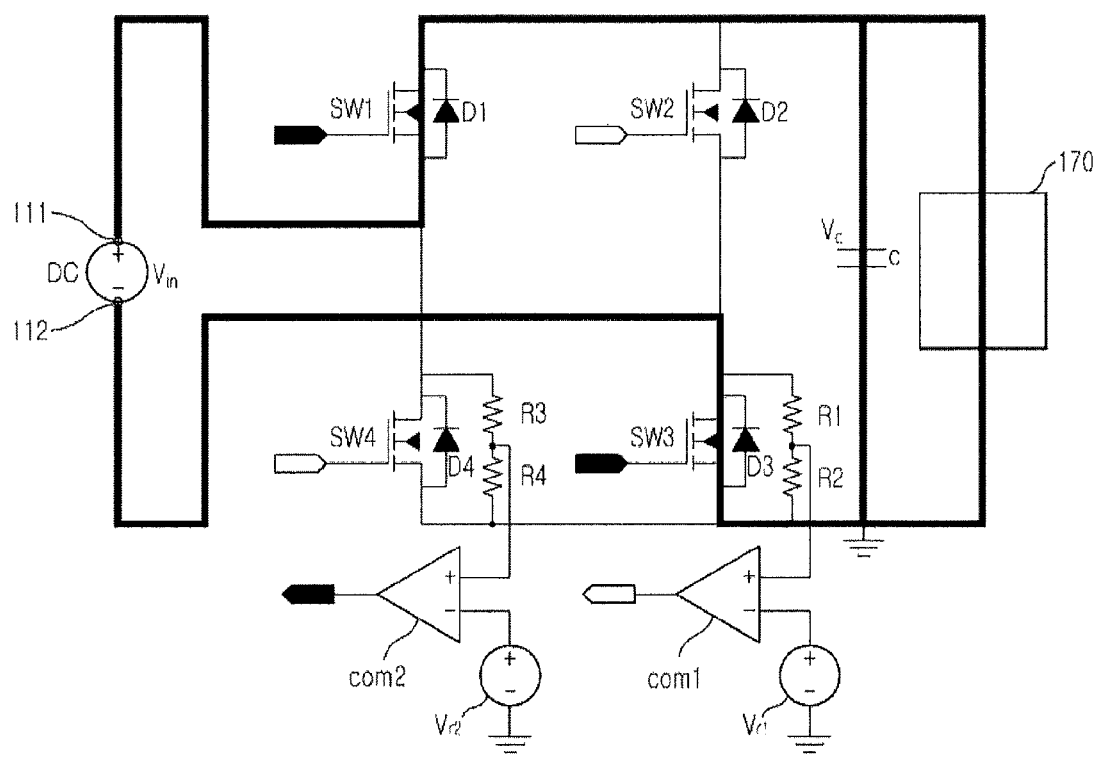

FIGS. 3A and 3B illustrate the current flow at the time of applying a DC power having a normal polarity to the DC power supply apparatus in accordance with the embodiment of the present disclosure.

As illustrated on FIG. 3A, when each of the first terminal 111 and the second terminal 112 of the DC power supply apparatus is normally connected to the established polarity by having the first terminal 111 and the second terminal 112 of the DC power supply apparatus connected to the positive (+) voltage terminal of and the negative (−) voltage terminal of the DC power source terminal of outside, the DC power supply apparatus is input with the positive (+) polarity voltage through the first terminal 111, and is input with the negative (−) polarity voltage through the second terminal 112.

That is, the DC power supply apparatus, through the firth terminal 111 and the second terminal 112, is input with the DC power supply Vin of outside. At this time, the current flow is formed from the first terminal 111 to the second terminal 112.

First, the current flows to the first diode D1 of the MOSFET connected to the first terminal 111, and the current passed through the first diode D1 flows to the third diode D3 of the third MOSFET through the load 170 and the capacitor C, and then flows to the second terminal 112. As a result, the first current path is formed, and the polarity of the DC power supply normally connected between the DC power source terminal of outside and the DC power supply apparatus may be maintained.

At this time, all the switches included in the first MOSFET to the fourth MOSFET are at OFF position, and a current does not flow therethrough.

Next, in a state when the first current path is formed, the polarity correction unit at which the current flow is formed is detected through the first polarity detection unit and the second polarity detection unit.

The first polarity detection unit 141 detects the first distribution voltage between the first resistor R1 and the second resistor R2, and the second polarity detection unit 142 detects the second distribution voltage between the third resistor R3 and the fourth resistor R4.

At this time, since the distribution voltage corresponding to the voltage of the both ends of the third diode D3 is detected at the first polarity detection unit 141, the distribution voltage detected is less than the first reference voltage, and since the distribution voltage corresponding to the voltage between the first terminal 111 and the ground is detected at the second polarity detection unit 142, the distribution voltage detected is more than the second reference voltage.

As the above, a low signal is output through the first comparison unit com1 of the first polarity detection unit 141 and a high signal is output through the second comparison unit com2 of the second polarity detection unit 142.

The control unit 150 is input with the detection signals from the first comparison unit com1 and the second comparison unit com2, confirms the comparison unit that has transmitted a low signal, and controls the switch of the switch unit corresponding to the confirmed comparison unit at the ON position.

At this time, since a low signal is input from the first comparison unit, the control unit 150 controls the first switch SW1 of the first MOSFET and the third switch SW3 of the third MOSFET of the first switch unit 161 at the ON position.

Here, the information of the first switch unit 161 corresponding to the first comparison unit com1 and the information of the second switch unit 162 corresponding to the second comparison unit com2 are pre-stored.

Alternatively, the control unit 150 may be input with the detection signals from the first comparison unit com1 and the comparison unit, and confirm the comparison unit that has transmitted a high signal, and control the switch of the switch unit corresponding to the confirmed comparison unit at the ON position. In the case as the above, the information of the second switch unit 162 corresponding to the first comparison unit com1 and the information of the first switch unit 161 corresponding to the second comparison unit com2 may be pre-stored.

As illustrated on FIG. 3B, as a high signal is input to the gate of the first switch SW1 of the first switch unit 161 of the DC power supply apparatus and a high signal is input into the gate of the third switch SW3 of the first switch unit 161 of the DC power supply apparatus, the first switch SW1 and the third switch SW3, both of which are of the first switch unit 161 of the DC power supply apparatus, are operated at the ON position.

In a state when the polarity of the DC power is maintained as above, the current path is changed from passing through the diodes D1 and D3 to passing through the switch SW1 and the switch SW3, both of which are provided with less resistance when compared to the diode D1 and the diode D3.

That is, the current of the DC power supply apparatus flows to the first switch SW1 of the first MOSFET connected to the first terminal 111, and the current passed through the first switch SW1 flows to the second terminal 112 after flowing to the third switch SW3 of the third MOSFET through the load 170 and the capacitor C.

The flow of the current from the first terminal 111 to the second terminal 112 is reformed as a result.

Figure 4A:
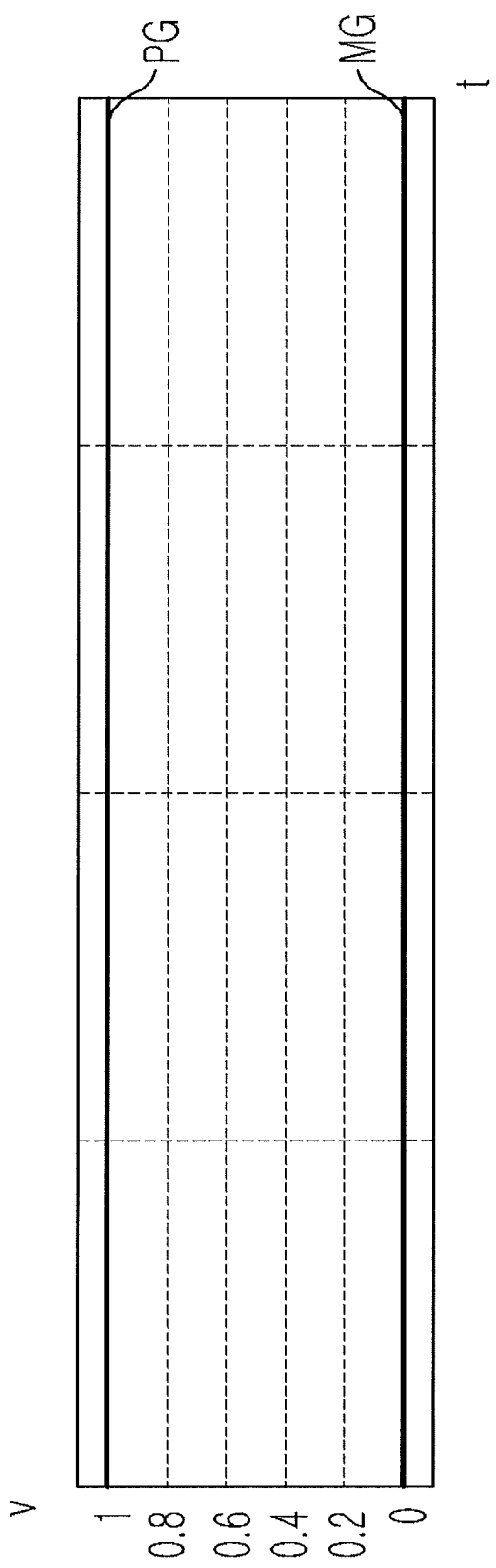
FIGS. 4A and 4B illustrate an output signal graph of a comparison unit at the time of applying a DC power having a normal polarity to the DC power supply apparatus in accordance with the embodiment of the present disclosure, and a graph showing a voltage of an input DC power and a voltage of a DC link at the time of applying a DC power having a normal polarity to the DC power supply apparatus in accordance with the embodiment of the present disclosure.
Figure 4B:
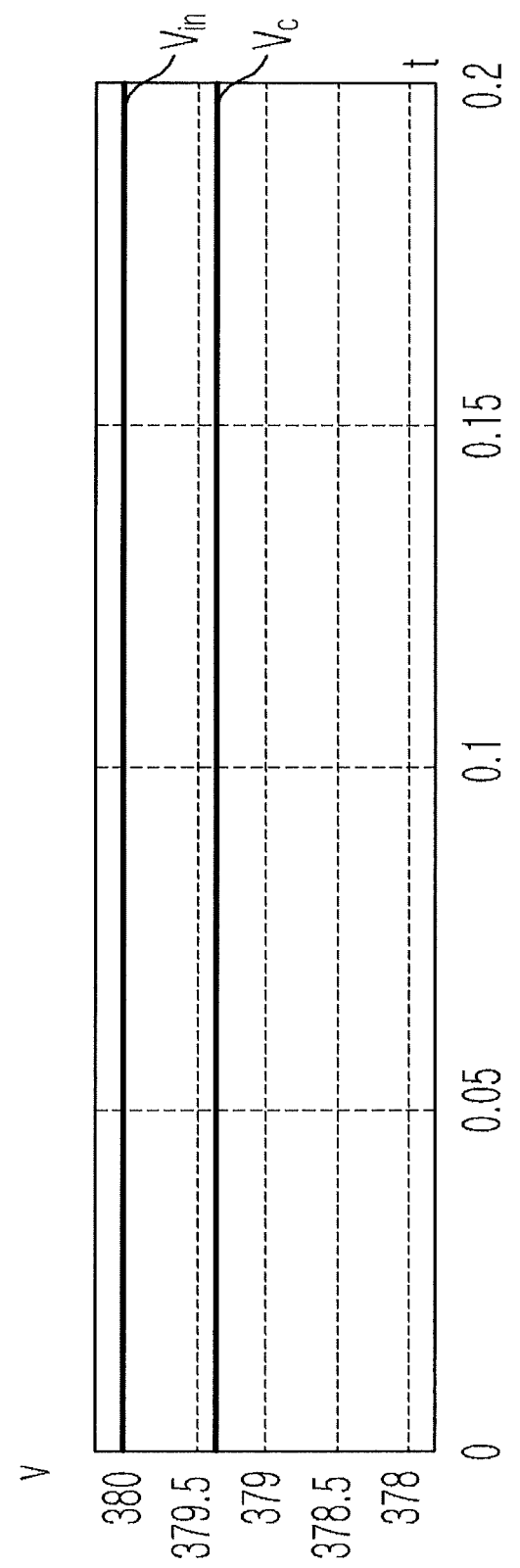

On FIG. 4A, an output signal graph of a comparison unit at the time of applying a DC power having a normal polarity to the DC power supply apparatus in accordance with the embodiment of the present disclosure is illustrated, and on FIG. 4B, a graph showing a voltage of an input DC power and a voltage of a DC link at the time of applying a DC power having a normal polarity to the DC power supply apparatus in accordance with the embodiment of the present disclosure is illustrated.

As illustrated on FIG. 4A, as a low signal is output from the output (MG: Minus Gate) of the first comparison unit, and a high signal is output from the output (PG: Plus Gate) of the second comparison unit, a high signal is input into the gate (PG: Plus Gate) of the first switch SW1 of the first MOSFET and the gate (PG: Plus Gate) of the third switch SW3 of the third MOSFET, the first switch and the third switch being operated when a positive (+) voltage is applied, and a low signal is input into the gate (MG: Minus Gate) of the second switch SW2 of the second MOSFET and the gate (MG: Minus Gate) of the fourth switch SW4 of the fourth MOSFET, the second switch and the fourth switch being operated when a negative (−) voltage is applied.

At this time, the voltage Vin of the DC power is at about 380V, and the voltage Vc of the DC link which is the voltage of both ends of the capacitor C is about 379.4V. That is, the DC power supply apparatus is found to have less loss of power.

Figure 5A:
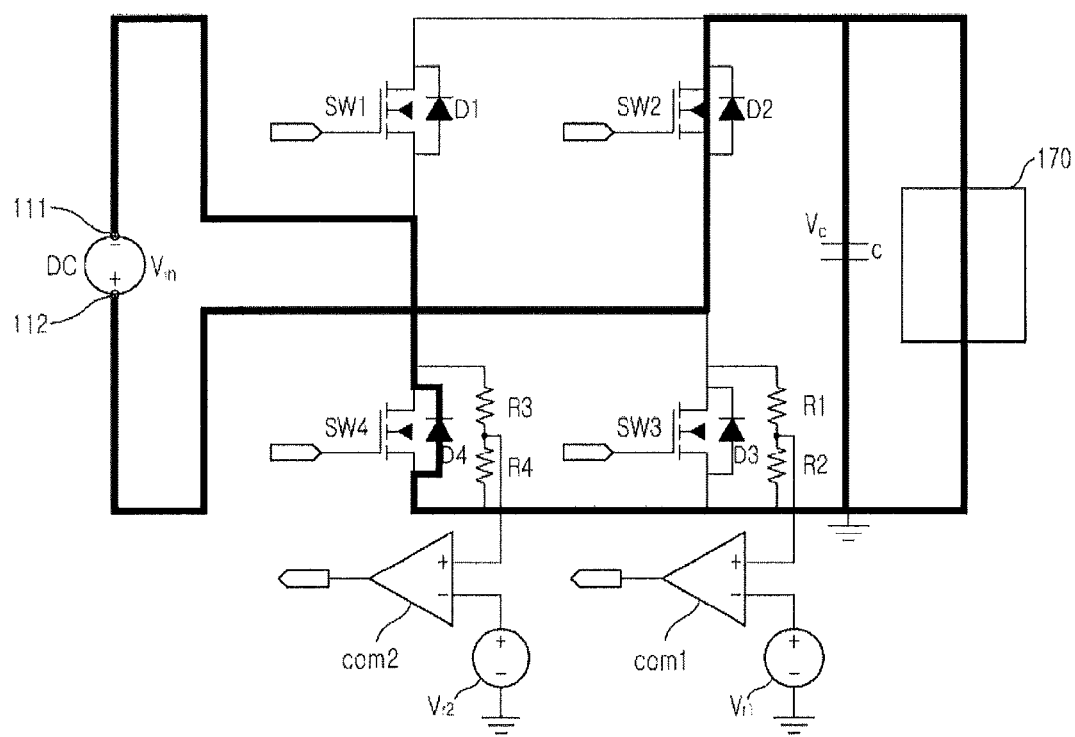
FIGS. 5A and 5B illustrate the current flow at the time of applying a DC power having an abnormal polarity to the DC power supply apparatus in accordance with the embodiment of the present disclosure.
Figure 5B:
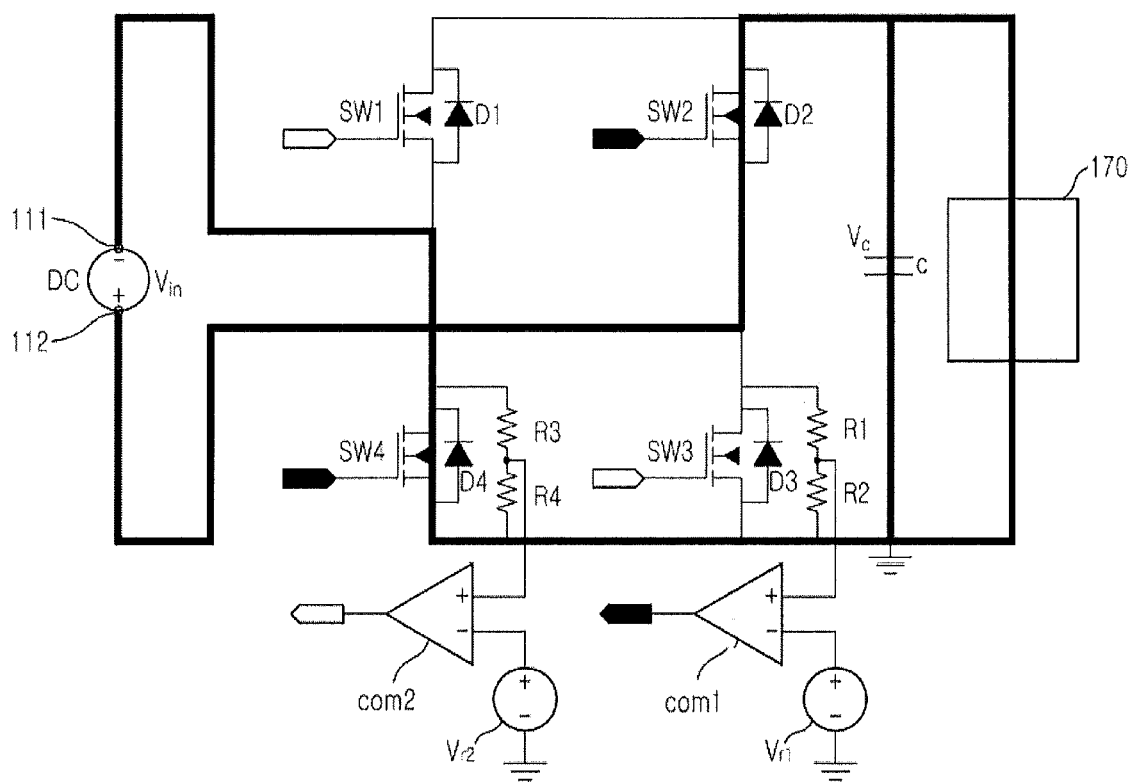

FIGS. 5A and 5B illustrate the current flow at the time of applying a DC power having an abnormal polarity to the DC power supply apparatus in accordance with the embodiment of the present disclosure is illustrated.

As illustrated on FIG. 5A, when the first terminal 111 and the second terminal 112 of the DC power supply apparatus are abnormally connected to the polarities that are opposite to the polarities established, respectively, to the first terminal 111 and the second terminal 112, as the first terminal 111 of the DC power supply apparatus is connected to the negative (−) voltage terminal of the DC power source terminal of outside and the second terminal 112 is connected to the positive (+) voltage terminal of the DC power source terminal of outside, the DC power supply apparatus is input with the positive (+) voltage through the first terminal 111 and is input with the negative (−) voltage through the second terminal 112.

That is, the DC power supply apparatus, through the first terminal 111 and the second terminal 112, is input with the DC power supply Vin of outside. At this time, a current flow from the second terminal 112 to the first terminal 111 is formed.

First, the current flows to the second diode D1 of the second MOSFET connected to the second terminal 112, and the current passed through the second diode D2 flows to the fourth diode D4 of the fourth MOSFET through the load 170 and the capacitor C, and then flows to the first terminal 111. Accordingly, the second current path is formed, and the polarity of the DC power supply abnormally connected between the DC power source terminal of outside and the DC power supply apparatus may be corrected.

At this time, all the switches included in the first MOSFET to the fourth MOSFET are at the OFF position, and a current does not flow therethrough.

Next, in a state when the second current path is formed, the polarity correction unit at which the current flow is formed is detected through the first polarity detection unit and the second polarity detection unit.

The first polarity detection unit 141 detects the first distribution voltage between the first resistor R1 and the second resistor R2, and the second polarity detection unit 142 detects the second distribution voltage between the third resistor R3 and the fourth resistor R4.

At this time, since the distribution voltage corresponding to the voltage between the second terminal 112 and the ground is detected at the first polarity detection unit 141, the distribution voltage detected is more than the first reference voltage, and since the distribution voltage corresponding to the voltage of the both ends of the fourth diode D4 is detected at the second polarity detection unit 142, the distribution voltage detected is less than the first reference voltage.

As the above, a high signal is output through the first comparison unit com1 of the first polarity detection unit 141 and a low signal is output through the second comparison unit com2 of the second polarity detection unit 142.

The control unit 150 is input with the detection signals from the first comparison unit com1 and the second comparison unit com2, confirms the comparison unit that has transmitted a low signal, and controls the switch of the switch unit corresponding to the confirmed comparison unit at ON position.

At this time, since a low signal is input from the second comparison unit, the control unit 150 controls the second switch SW2 of the second MOSFET and the fourth switch SW4 of the fourth MOSFET at ON position As illustrated on FIG. 5B, as a high signal is input into the gate of the second switch SW2 of the second switch unit 162 of the DC power supply apparatus and a high signal is input into the gate of the fourth switch SW4 of the second switch unit 162 of the DC power supply apparatus, the second switch SW2 and the fourth switch SW4, both of which are of the second switch unit 162 of the DC power supply apparatus, are operated at ON position.

In a state when the polarity of the DC power supply is corrected as above, the current path is changed from flowing through the diodes D2 and D4 to flowing through the switch SW2 and the switch SW4, both of which are provided with less resistance when compared to the diode D2 and the diode D4.

That is, the current of the DC power supply apparatus flows to the second switch SW2 of the second MOSFET connected to the second terminal 112, and the current passed through the second switch SW2 flows to the first terminal 111 after flowing to the fourth switch SW4 of the fourth MOSFET through the load 170 and the capacitor C.

The flow of the current from the second terminal 112 to the first terminal 111 is reformed as a result.

Figure 6A:
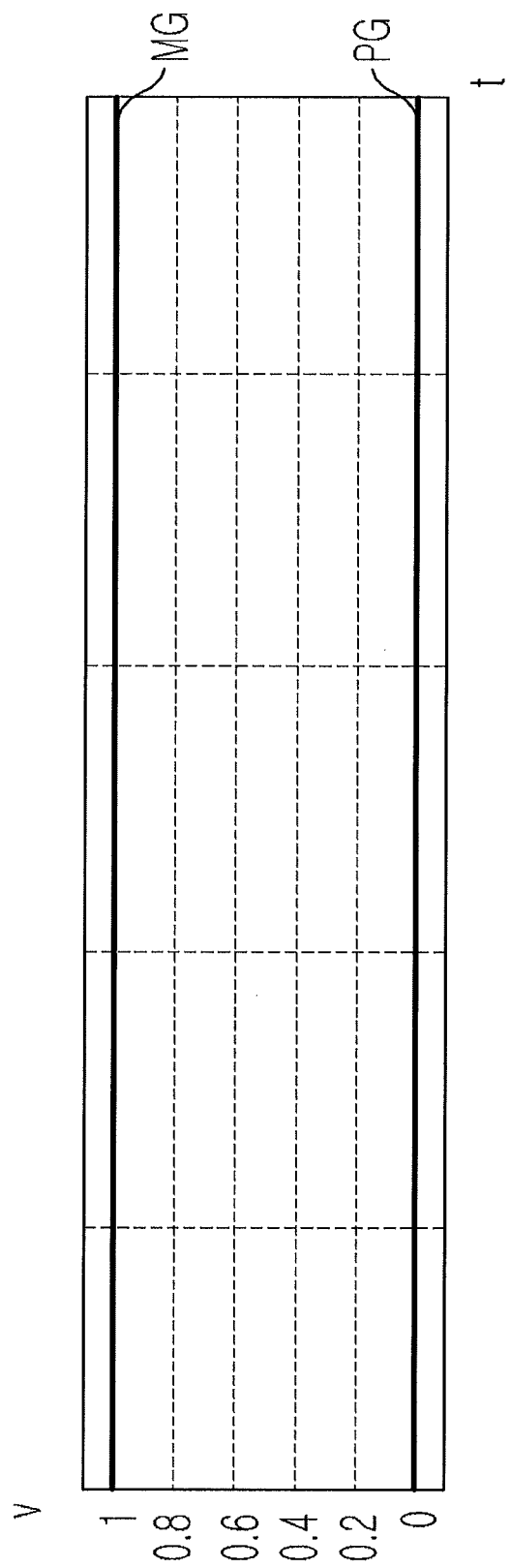
FIGS. 6A and 6B illustrate an output signal graph of a comparison unit at the time of applying a DC power supply having an abnormal polarity to the DC power supply apparatus in accordance with the embodiment of the present disclosure, and a graph showing a voltage of an input DC power and a voltage of a DC link at the time of applying a DC power having an abnormal polarity to the DC power supply apparatus in accordance with the embodiment of the present disclosure.
Figure 6B:
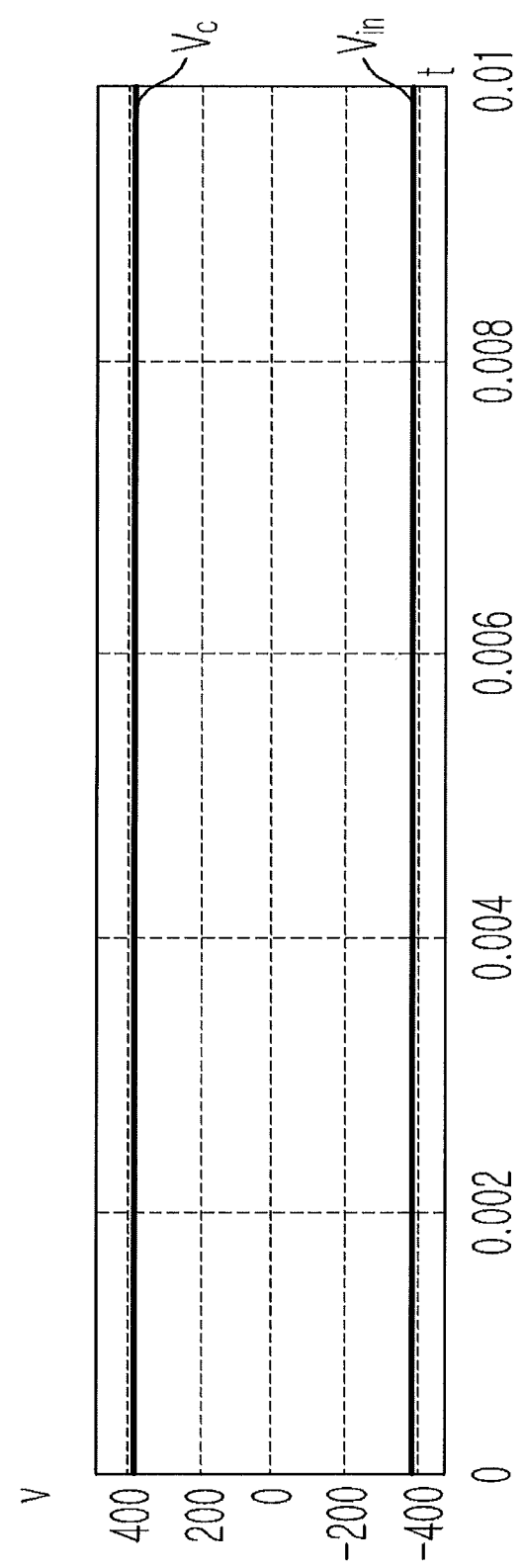

On FIG. 6A, an output signal graph of a comparison unit at the time of applying a DC power supply having an abnormal polarity to the DC power supply apparatus in accordance with the embodiment of the present disclosure is illustrated, and on FIG. 6B, a graph showing a voltage of an input DC power and a voltage of a DC link at the time of applying a DC power having an abnormal polarity to the DC power supply apparatus in accordance with the embodiment of the present disclosure is illustrated.

As illustrated on FIG. 6A, as a high signal is output from the output (MG: Minus Gate) of the first comparison unit and a low signal is output from the output (Plus Gate) of the second comparison unit, a high signal is input into the gate (MG: Minus Gate) of the second switch SW2 of the second MOSFET and the gate (MG: Minus Gate) of the fourth switch SW4 of the fourth MOSFET, the second switch and the fourth switch being operated when a negative (−) voltage is applied, and a low signal is input into the gate (PG: Plus Gate) of the first switch SW1 of the first MOSFET and the gate (PG: Plus Gate) of the third switch SW3 of the third MOSFET, the first switch and the third switch being operated when a positive (+) voltage is applied.

At this time, the voltage Vin of the DC power is at about −380V, and the voltage Vc of the DC link which is the voltage of the both ends of the capacitor C is about 380V. That is, the DC power supply apparatus is found to have less loss of power. In addition, it is found that the polarity of the DC power supply entered thereto is being corrected.

As the above, the DC power supply apparatus of the present disclosure corrects the polarity of the DC power supply by using the body diode of the MOSFET, and then, by turning on the MOSFET changes the current path, changes the current path from flowing through the diode having greater loss factor to flowing through the MOSFET.

As the current flows to the MOSFET channel, not to the diode having relatively greater loss factor, since the loss factor is lower at the MOSFET in contrast to the diode, power loss may be reduced.

In addition, since the correction of the polarity of the DC power supply apparatus is implemented by only using the MOSFET without using a separate bridge diode, the embodiment may be done easily.

FIGS. 7A to 10B each illustrate a graph of the power loss of a washing machine applied with the DC power supply apparatus in accordance with the embodiment of the present disclosure and a graph of the power loss of a washing machine applied with a conventional DC power supply apparatus.

FIGS. 7A, 8A, 9A and 10A are graphs of power loss of a conventional DC power supply apparatus using a bridge diode, and FIGS. 7B, 8B, 9B and 10B are graphs of power loss of a DC power supply apparatus of the embodiment of the present disclosure.

Figure 7B:
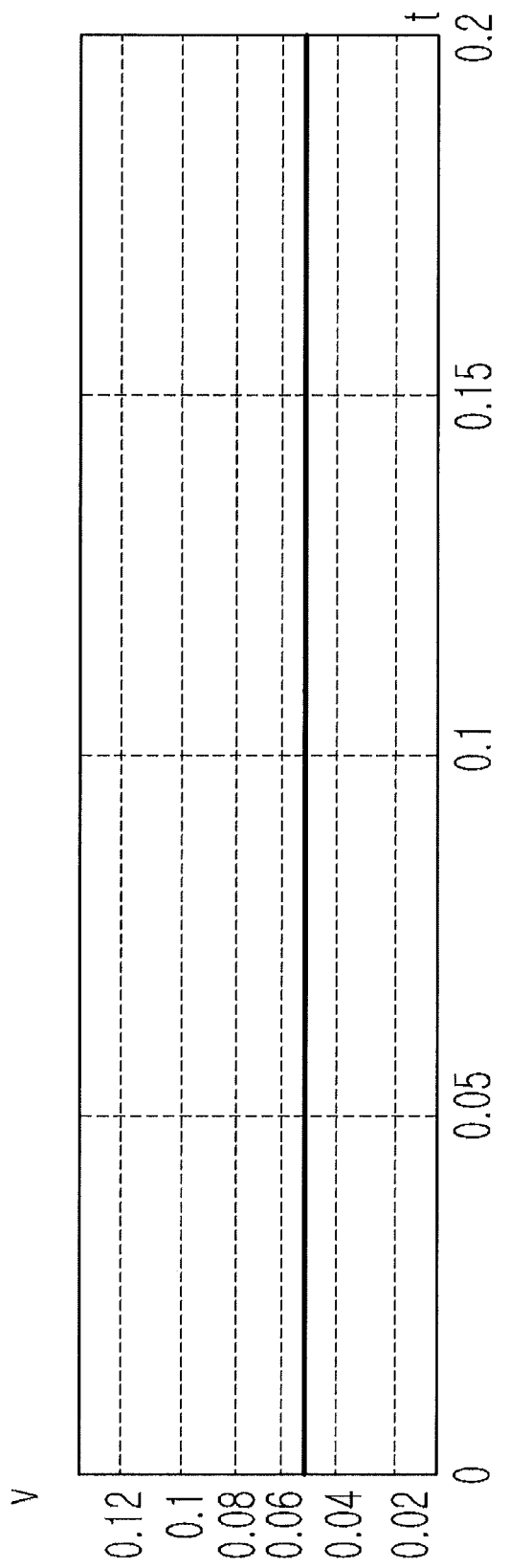

FIGS. 7A and 7B illustrate the power loss graphs at a standby cycle, and the power loss of a conventional drum washing machine is about 1.73 W, and the power loss of the embodiment of the present disclosure is at about 0.05 W.

Figure 8B:
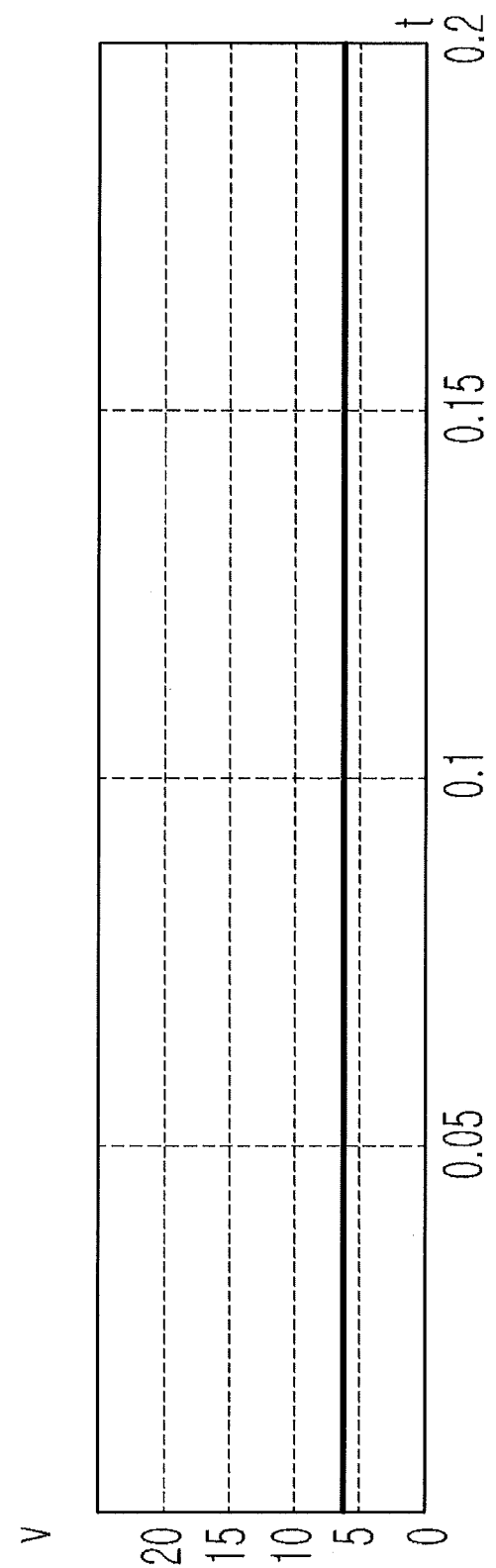

FIGS. 8A and 8B illustrate the power loss graphs at a washing cycle, and the power loss of a conventional drum washing machine is about 19.0 W, and the power loss of the embodiment of the present disclosure is at about 6.09 W.

Figure 9B:
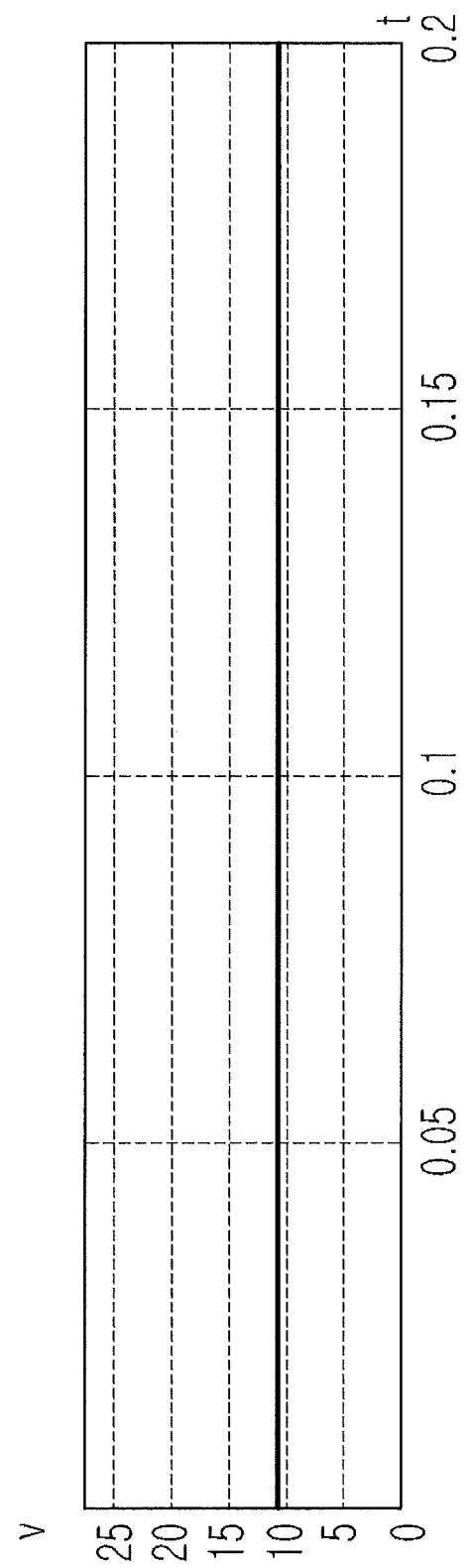

FIGS. 9A and 9B illustrate the power loss graphs at a hot water supply cycle, and the power loss of a conventional drum washing machine is about 25.7 W, and the power loss of the embodiment of the present disclosure is at about 11.12 W.

Figure 10B:
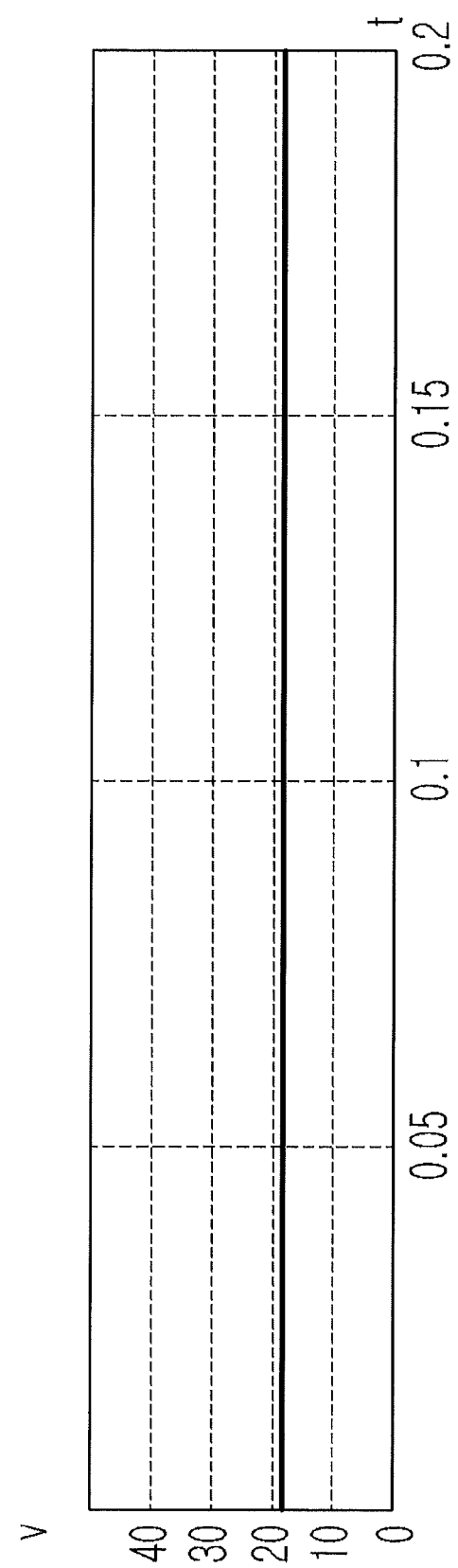

FIGS. 10A and 10B illustrate the power loss graph at a drying cycle, and the power loss of a conventional drum washing machine is about 42.2 W, and the power loss of the embodiment of the present disclosure is at about 18.84 W.

As described above, the lower power loss is provided at the DC power supply apparatus using the MOSFET, when compared to the DC power supply apparatus using the bridge diode at each operation cycle.

Figure 11:
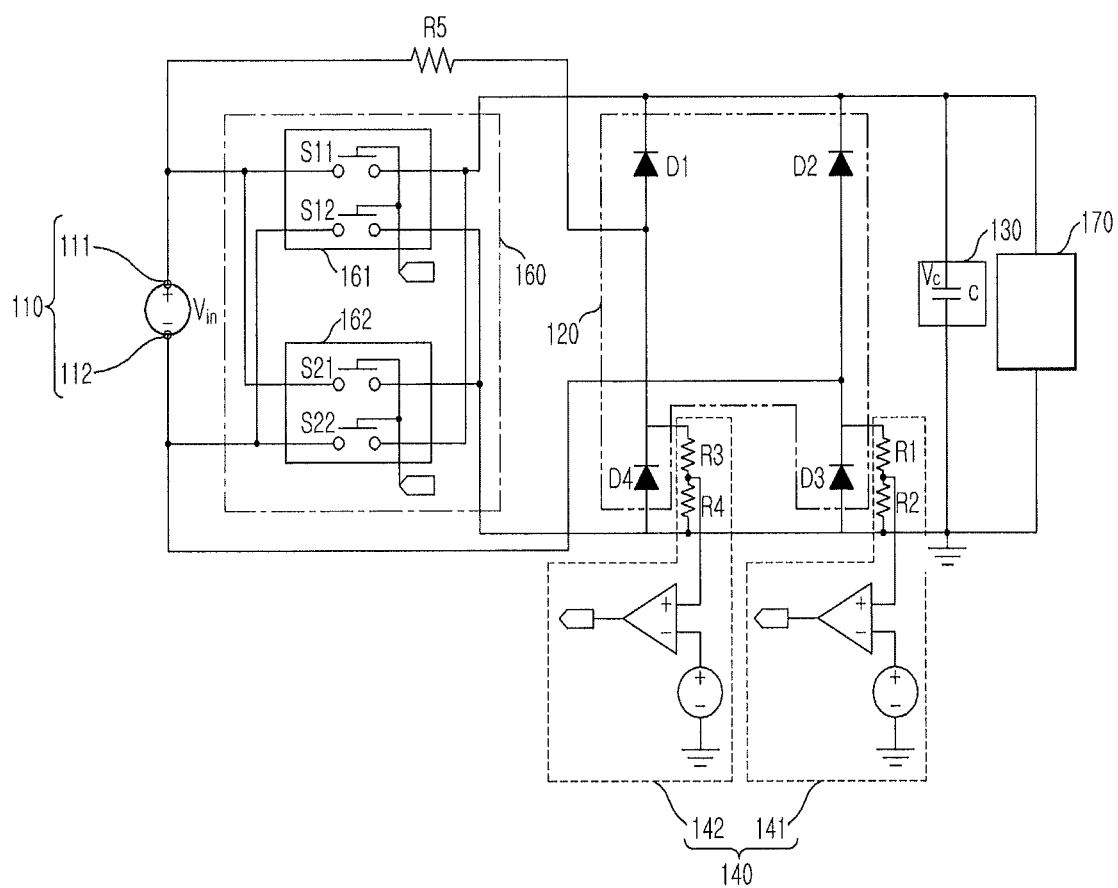
FIG. 11 is a circuit diagram of a DC power supply apparatus in accordance with another embodiment of the present disclosure.

FIG. 11 is a circuit diagram of a DC power supply apparatus in accordance with another embodiment of the present disclosure, and the DC power supply apparatus including the switch unit 160 formed with the relay therein and the polarity correction unit 120 formed with the diode will be used as examples for explanation.

The DC power supply apparatus includes the input unit 110 connected to the DC power source terminal of outside.

Here, the input unit 110 includes the first terminal 111 connected to the voltage terminal having a positive (+) polarity among the DC power source terminals of outside, and the second terminal 112 connected to the voltage terminal having a negative (−) polarity. The input unit 110 is supplied with a DC power of outside Vin through the first terminal 111 and the second terminal 112.

The DC power supply apparatus includes the first switch unit 161 and the first polarity correction unit 121, which are configured to form the first current path between the input unit 110 and the load 170, and the second switch unit 162 and the second polarity correction unit 122, which are configured to form the second current path between the input unit 110 and the load 170.

Here, the first switch unit 161 includes a first relay S11 and a second relay S12, and the second switch unit 162 includes a third relay S21 and a fourth relay S22.

A first contact point of the first relay S11 is connected to the first terminal 111, a second contact point of the first relay S11 is connected to the load 170, a first contact point of the second relay S12 is connected to the second terminal 112, and a second contact point of the second relay S12 is connected to the ground.

Here, the first contact point and the second contact point of the first relay S11 and the second relay S12 are electrically connected by an armature.

The armature moves according to the command of the control unit 150. That is, when a current is applied to a coil according to the command of the control unit 150, the coil changes into an electromagnet, and the armature is moved by the electromagnet to connect the first contact point and the second contact point.

A first contact point of the third relay S21 is connected to the first terminal 111, a second contact point of the third relay S21 is connected to the load 170, a first contact point of the fourth relay S22 is connected to the second terminal 112, and a second contact point of the fourth relay S22 is connected to the ground.

Here, the first contact point of the third relay S21 and the second contact point of the fourth relay S22 are also electrically connected by the armature.

The armature also moves according to the command of the control unit 150. That is, when a current is applied to a coil according to the command of the control unit 150, the coil changes into an electromagnet, and the armature is moved by the electromagnet to connect the first contact point and the second contact point.

The first polarity correction unit 121 includes a first diode D1 and a third diode D3, the second polarity correction unit 121 includes a second diode D2 and a fourth diode D4. Here, the diodes from first diode to the fourth diode form a bridge diode.

A cathode of the first diode D1 is connected to the second contact point of the first relay S11 and to the second contact point of the fourth relay S22, and an anode of the first diode D1 is connected to the first terminal 111. At this time, the anode of the first diode D1 is connected to the first terminal 111 through a resistor R5. Here, the resistor R5 prevents the excess current from applied at the diode and the capacitor.

More in particular, when an initial current is applied in a state when the capacitor C is discharged, nearly unlimited amount of current flows until the capacitor C is recharged. On the contrary, when two terminals of the capacitor C are short circuited, the amount of the discharged current becomes large enough to generate sparks. That is, the resistor R5 limits the inrush current that flows at the capacitor first. In addition, the resistor R5, if the inrush current is higher than the rated current of the diode, prevents the diode from being damaged from overheating.

A cathode of the second diode D2 is connected to the second contact point of the first relay S11 and to the second contact point of the fourth relay S22, and also the cathode source is connected to the anode of the first diode D1. In addition, an anode of the second diode D2 is connected to the second terminal 112.

A cathode of the third diode D3 is connected to the second terminal 112, and also the cathode of the third diode D3 is connected to the anode of the second diode D2. An anode of the third diode D3 is connected to the ground, and also is connected to the second contact point of the second relay S12 and to the second contact point of the third relay S21.

A cathode of the fourth diode D4 is connected to the first terminal 111 through the resistor R5, and also is connected to the anode of the first diode D1. An anode source of the fourth diode D4 is connected to the ground, and also is connected to the second contact point of the second relay S12 and to the second contact point of the third relay S21.

The DC power supply apparatus further includes a capacitor C connected between the second contact point of the first and fourth relays S11 and S22 and the second contact point of the second and third relays S12 and S32.

The capacitor C is connected in parallel between the bridge diode D1 to D4 and the load 170. The load 170 is connected in parallel to the both ends of the capacitor C.

The DC power supply apparatus further includes the first polarity detection unit 141 connected to the first polarity correction unit 161, and the second polarity detection unit 142 connected to the second polarity correction unit 162.

The first polarity detection unit 141 includes the first voltage distribution unit R1 and R2 connected in parallel to the both ends of the third diode D3, and the first comparison unit com1 connected between the first resistor R1 and the second resistor R2 both of which are of the first voltage distribution unit.

The cathode of the third diode D3 is connected to one side of the first distribution resistor, and the second terminal 122 also is connected to the one side of the first distribution resistor. The anode of the third diode D3 is connected to the other side of the first distribution resistor and the ground is also connected to the other side of the first resistor.

The first comparison unit com1 is input with the first distribution voltage from the first distribution resistor through a positive (+) terminal, and is input with the first reference voltage Vr1 through a negative (−) terminal. The first comparison unit com1 compares the first distribution voltage with the first reference voltage, and when the first distribution voltage is above the first reference voltage, outputs a high signal, and when the first distribution voltage is below the first reference voltage, outputs a low signal.

At this time, the first comparison unit com1 outputs the high signal or the low signal, both of which are the detection signals, to the control unit 150.

The second polarity detection unit 142 includes a second voltage distribution unit R3 and R4 connected in parallel to the both ends of the fourth diode D4, and the second comparison unit com2 connected between the third resistor R3 and the fourth resistor R4, both of which are of the second voltage distribution unit.

The cathode of the fourth diode D4 is connected to one side of the second distribution resistor, and the first terminal 121 is also connected to the one side of the second distribution resistor. The anode of the fourth diode D4 is connected to the other side of the second distribution resistor and the ground is also connected to the other side of the second distribution resistor.

The second comparison unit com2 is input with the second distribution voltage from the second distribution resistor through the positive (+) source, and is input with the second reference voltage Vr2 therein through the negative (−) terminal. The second comparison unit com2 compares the second distribution voltage with the second reference voltage, and in a case when the second distribution voltage is above the second reference voltage, the second comparison unit com2 outputs a high signal, and in a case when the second distribution voltage is below the second reference voltage, the second comparison unit com1 outputs a low signal.

At this time, the second comparison unit com2 outputs the high signal or the low signal, both of which are the detection signals, to the control unit 150.

The control unit 150, on the basis of the detection signals transmitted from the first comparison unit com1 and the second comparison unit com2, controls the current applied to the coils of the plurality of the relays S11, S12, S21, and S22.

Current is applied simultaneously to the first relay S11 and the second relay S12, each of both is the first switch unit 161, or current is applied simultaneously to the third relay S21 and the fourth relay S22, each of both is the second switch unit 162.

By referring to FIGS. 12A to 15B, the current flow of the DC power supply apparatus formed as the above will be explained.

Figure 12A:
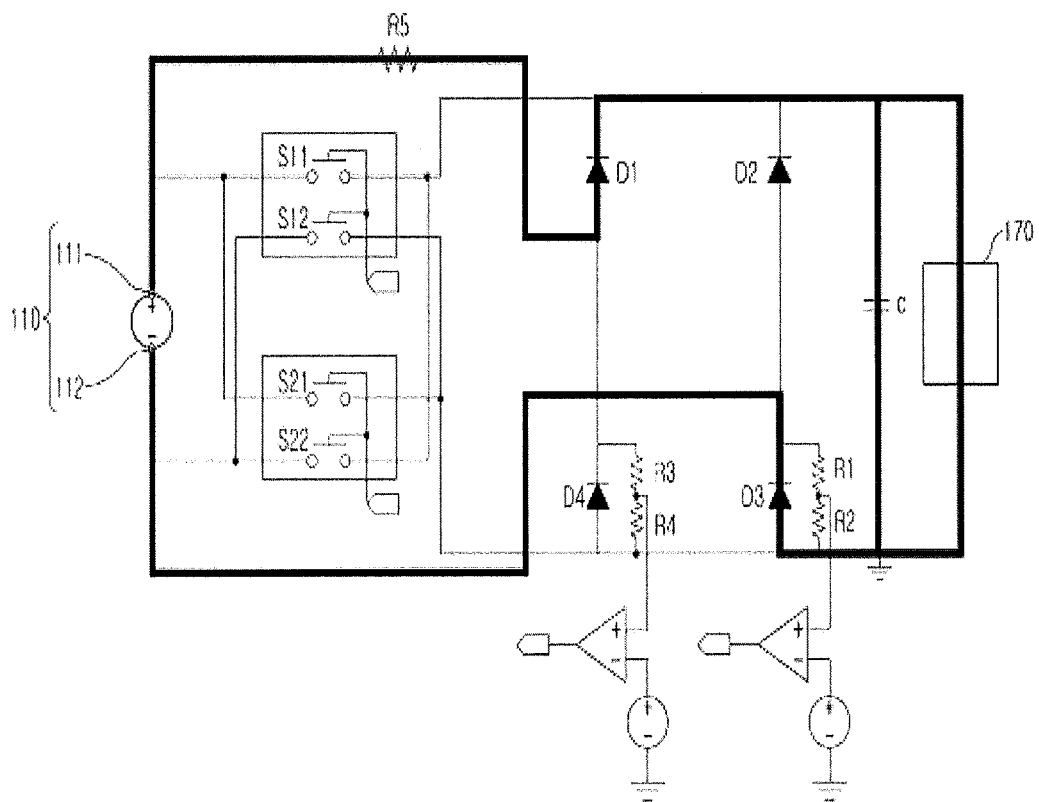
FIGS. 12A and 12B illustrate the current flow at the time of applying a DC power supply having a normal polarity to the DC power supply apparatus in accordance with the other embodiment of the present disclosure.
Figure 12B:
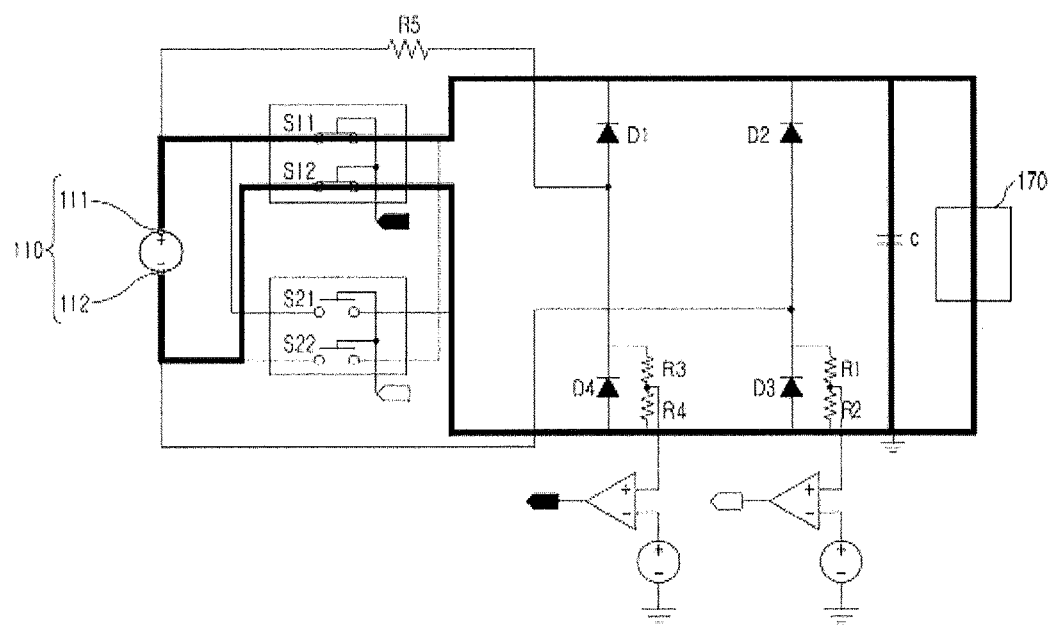

FIGS. 12A and 12B illustrate the current flow at the time of applying a DC power supply having a normal polarity to the DC power supply apparatus in accordance with the other embodiment of the present disclosure.

As illustrated on FIG. 12A, when each of the first terminal 111 and the second terminal 112 of the DC power supply apparatus is normally connected to the polarity established to each of the first terminal 111 and the second terminal by having the first terminal 111 of the DC power supply apparatus connected to the positive voltage terminal of the DC power source terminal and by having the second terminal 112 of the DC power supply apparatus connected to the negative voltage terminal of the DC power source terminal, the DC power supply apparatus is input with the voltage having a positive (+) polarity through the first terminal 111, and is input with the voltage having a negative (−) polarity through the second terminal 112.

That is, the DC power supply apparatus, through the firth terminal 111 and the second terminal 112, is input with the DC power Vin of outside. At this time, the current flow is formed from the first terminal 111 to the second terminal 112.

First, the current flows to the first diode D1 through the resistor R5 connected to the first terminal 111, and the current passed through the first diode D1 flows to the third diode D3 through the load 170 and the capacitor C, and then flows to the second terminal 112. As a result, the first current path is formed, and the polarity of the DC power supply normally connected between the DC power source terminal of outside and the DC power supply apparatus may be maintained.

At this time, the switches from the second relay to the fourth relay are at OFF position, and a current does not flow therethrough.

Next, in a state when the first current path is formed, the polarity correction unit at which the current flow is formed is detected through the first polarity detection unit 141 and the second polarity detection unit 142.

The first polarity detection unit 141 detects the first distribution voltage between the first resistor R1 and the second resistor R2, and the second polarity detection unit 142 detects the second distribution voltage between the third resistor R3 and the fourth resistor R4.

At this time, since the distribution voltage corresponding to the voltage of the both ends of the third diode D3 is detected at the first polarity detection unit 141, the distribution voltage detected is less than the first reference voltage, and since the distribution voltage corresponding to the voltage between the first terminal 111 and the ground is detected at the second polarity detection unit 142, the distribution voltage detected is more than the second reference voltage.

As the above, a low signal is output through the first comparison unit com1 of the first polarity detection unit 141 and a high signal is output through the second comparison unit com2 of the second polarity detection unit 142.

The control unit 150 is input with the detection signals from the first comparison unit com1 and the second comparison unit com2, confirms the comparison unit that has transmitted a low signal, and controls the switch of the switch unit corresponding to the confirmed comparison unit at the ON position.

At this time, since a low signal is input from the first comparison unit, the control unit 150 controls the first relay S11 and the second relay S12 of the first switch unit 161 at the ON position.

Here, the information of the first switch unit 161 corresponding to the first comparison unit com1 and the information of the second switch unit 162 corresponding to the second comparison unit com2 are pre-stored.

Alternatively, the control unit 150 may input with the detection signals from the first comparison unit com1 and the second comparison unit com2, confirm the comparison unit that has transmitted a high signal, and control the switch of the switch unit corresponding to the confirmed comparison unit at the ON position. In the case as the above, the information of the second switch unit 162 corresponding to the first comparison unit com1 and the information of the first switch unit 161 corresponding to the second comparison unit com2 may be pre-stored.

As illustrated on FIG. 12B, as a high signal is input into the first relay S11 and at the second relay S12 of the first switch unit 161 of the DC power supply apparatus and a low signal is input into the third relay S21 and at the fourth relay S22 of the DC power supply apparatus, the first relay S11 and the second relay S12 are operated at the ON position and the third relay S21 and the fourth relay S22 are operated at the OFF position.

In a state when the polarity of the DC power supply is maintained as above, the current path is changed from flowing through the first diode D1 and the second diode D3 to flowing through the first relay S11 and the second relay S12 that are provided with less resistance when compared to the first diode D1 and the third diode D3.

That is, the current of the DC power supply apparatus flows to the first relay S11 connected to the first terminal 111, and the current passed through the first relay S11 flows to the second terminal 112 after flowing to the second relay S12 through the load 170 and the capacitor C.

The flow of the current from the first terminal 111 to the second terminal 112 is reformed as a result.

Figure 13A:
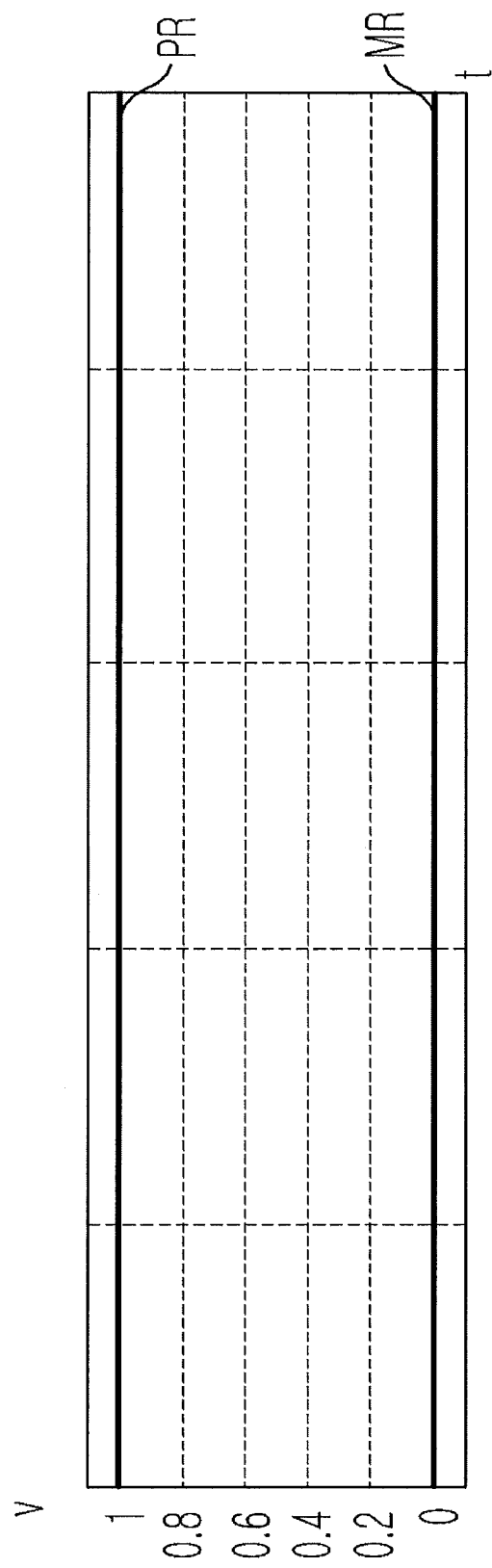
FIGS. 13A and 13B illustrate an output signal graph of a comparison unit at the time applying a DC power supply having a normal polarity to the DC power supply apparatus in accordance with the other embodiment of the present disclosure, and a graph showing a voltage of an input DC power and a voltage of a DC link at the time of applying a DC power supply having a normal polarity to the DC power supply apparatus in accordance with the other embodiment of the present disclosure.
Figure 13B:
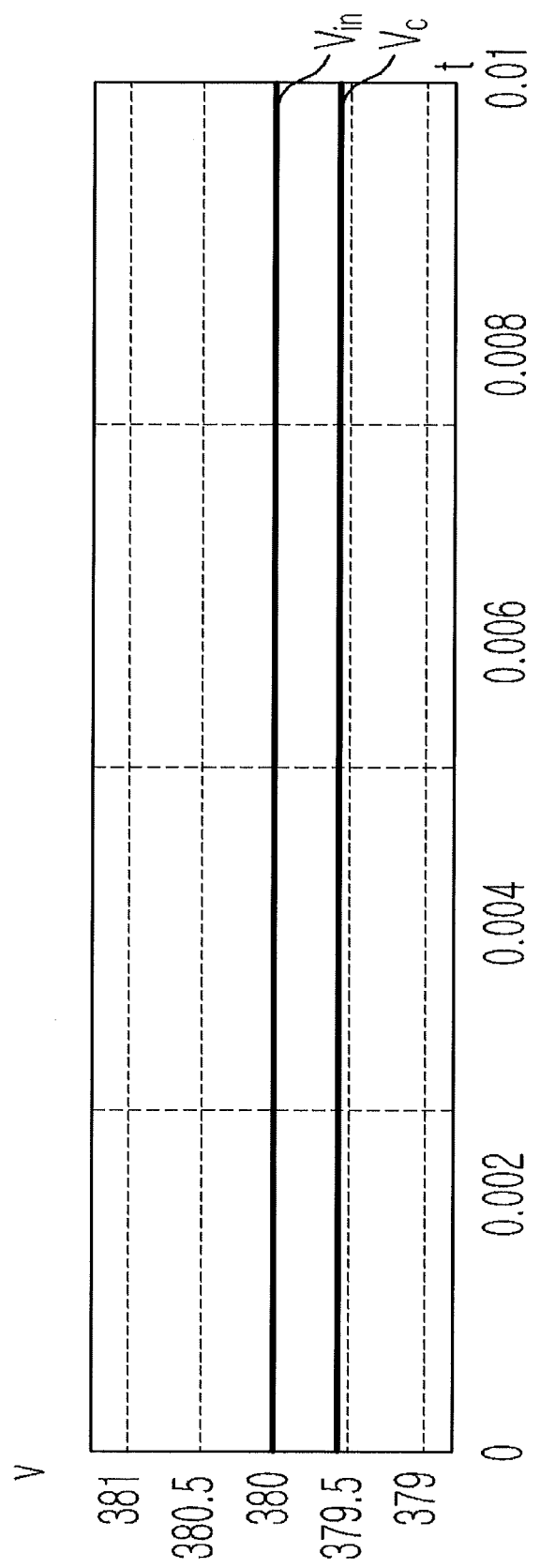

On FIG. 13A, an output signal graph of a comparison unit at the time applying a DC power supply having a normal polarity to the DC power supply apparatus in accordance with the other embodiment of the present disclosure. On FIG. 13B, a graph showing a voltage of an input DC power and a voltage of a DC link at the time of applying a DC power supply having a normal polarity to the DC power supply apparatus in accordance with the other embodiment of the present disclosure is illustrated.

As illustrated on FIG. 13A, as a low signal is output from the output (MR: Minus Relay) of the first comparison unit and a high signal is output from the output (PR: Plus Relay) of the second comparison unit, a current is applied to the coils of the first relay S11 and the second relay S12, both of which are operated at the time of the positive (+) voltage is applied, while a current is not applied to the coils of the third relay S21 and the fourth relay S22, both of which are operated at the time of the negative (−) voltage is applied.

At this time, the voltage Vin of the DC power supply is at about 380V, and the voltage Vc of the DC link which is the voltage of both ends of the capacitor C is about 379.4V. That is, the DC power supply apparatus is found to have less loss of power.

Figure 14A:
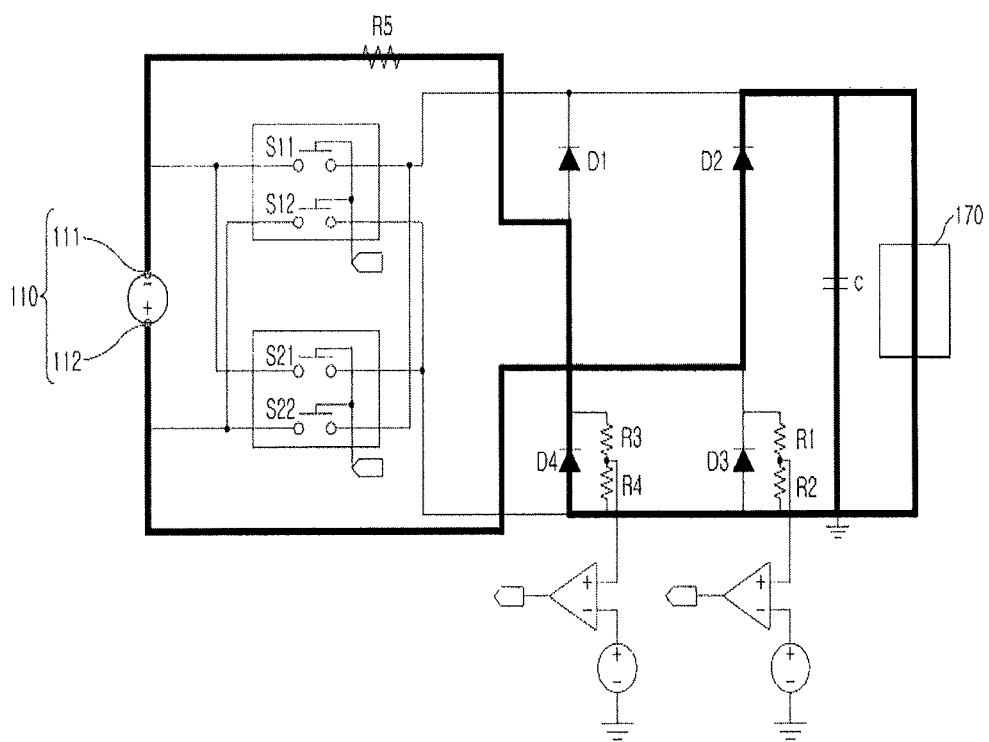
FIGS. 14A and 14B illustrate the current flow at the time of applying a DC power having an abnormal polarity to the DC power supply apparatus in accordance with the other embodiment of the present disclosure.
Figure 14B:
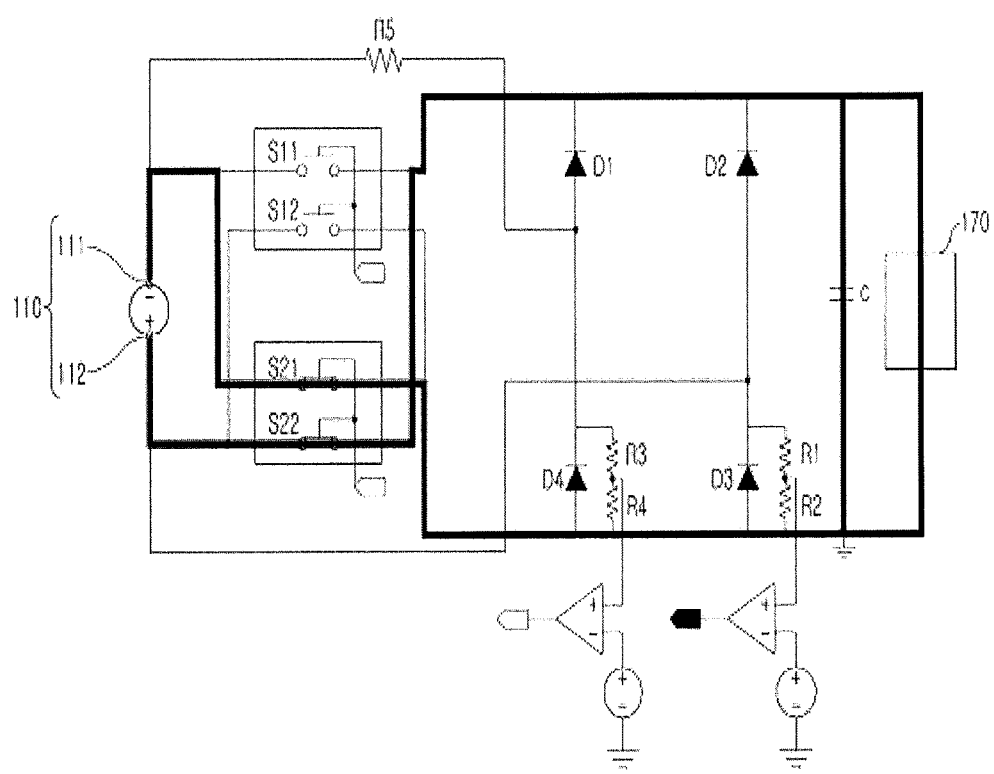

FIGS. 14A and 14B illustrate the current flow at the time of applying a DC power having an abnormal polarity to the DC power supply apparatus in accordance with the other embodiment of the present disclosure.

As illustrated on FIG. 14A, when each of the first terminal 111 and the second terminal 112 of the DC power supply apparatus is abnormally connected to each of the opposite polarity to the polarity established, as the first terminal 111 of the DC power supply apparatus is connected to the negative (−) voltage terminal of the DC power source terminal of outside and the second terminal 112 is connected to the positive (+) voltage terminal of the DC power source terminal of outside, the DC power supply apparatus is input with the positive (+) voltage through the first terminal 111 and is input with the negative (−) voltage through the terminal 112.

That is, the DC power supply apparatus, through the first terminal 111 and the second terminal 112, is input with the DC power supply Vin of outside. At this time, a current flow from the second terminal 112 to the first terminal 111 is formed.

First, the current flows to the second diode D1 connected to the second terminal 112, and the current passed through the second diode D2 flows to the fourth diode D4 through the load 170 and the capacitor C, and then flows to the first terminal 111 through the fifth resistor R5. As a result, the second current path is formed, and the polarity of the DC power supply abnormally connected between the DC power source terminal of outside and the DC power supply apparatus may be corrected.

At this time, the relays from the first relay to the fourth relay are at OFF position, and a current does not flow therethrough.

Next, in a state when the second current path is formed, the polarity correction unit at which the current flow is formed is detected through the first polarity detection unit and the second polarity detection unit.

The first polarity detection unit 141 detects the first distribution voltage between the first resistor R1 and the second resistor R2, and the second polarity detection unit 142 detects the second distribution voltage between the third resistor R3 and the fourth resistor R4.

At this time, since the distribution voltage corresponding to the voltage between the second terminal 112 and the ground is detected at the first polarity detection unit 141, the distribution voltage detected is more than the first reference voltage, and since the distribution voltage corresponding to the voltage of the both ends of the fourth diode D4 is detected at the second polarity detection unit 142, the distribution voltage detected is less than the first reference voltage.

As the above, a high signal is output through the first comparison unit com1 of the first polarity detection unit 141 and a low signal is output through the second comparison unit com2 of the second polarity detection unit 142.

The control unit 150 is input with the detection signals from the first comparison unit com1 and the second comparison unit com2, confirms the comparison unit that has transmitted a low signal, and controls the switch of the switch unit corresponding to the confirmed comparison unit at the ON position.

At this time, since a low signal is input from the second comparison unit, the control unit 150 controls the third relay S21 and the fourth relay S22 of the second switch unit 162 at the ON position.

As illustrated on FIG. 14B, the third relay S21 and the fourth relay S22 are operated at ON position, as the operating signal for the third relay and the fourth relay is transmitted according to the command of the control unit 150 and then the armature is operated when a current flows at the coils of the third relay S21 and the fourth relay S22 of the DC power supply apparatus.

In a state when the polarity of the DC power supply is corrected as above, the second current path is changed from flowing through the second diode D2 and the fourth diode D4 to flowing through the third relay S21 and the fourth relay S22, both of which are provided with less resistance when compared to the diode D2 and the diode D4.

That is, the current of the DC power supply apparatus flows to the fourth relay S22 connected to the second terminal 112, and the current passed through the fourth relay S22 flows to the first terminal 111 after flowing to the third relay S21 through the load 170 and the capacitor C.

The flow of the current from the second terminal 112 to the first terminal 111 is reformed as a result.

Figure 15A:
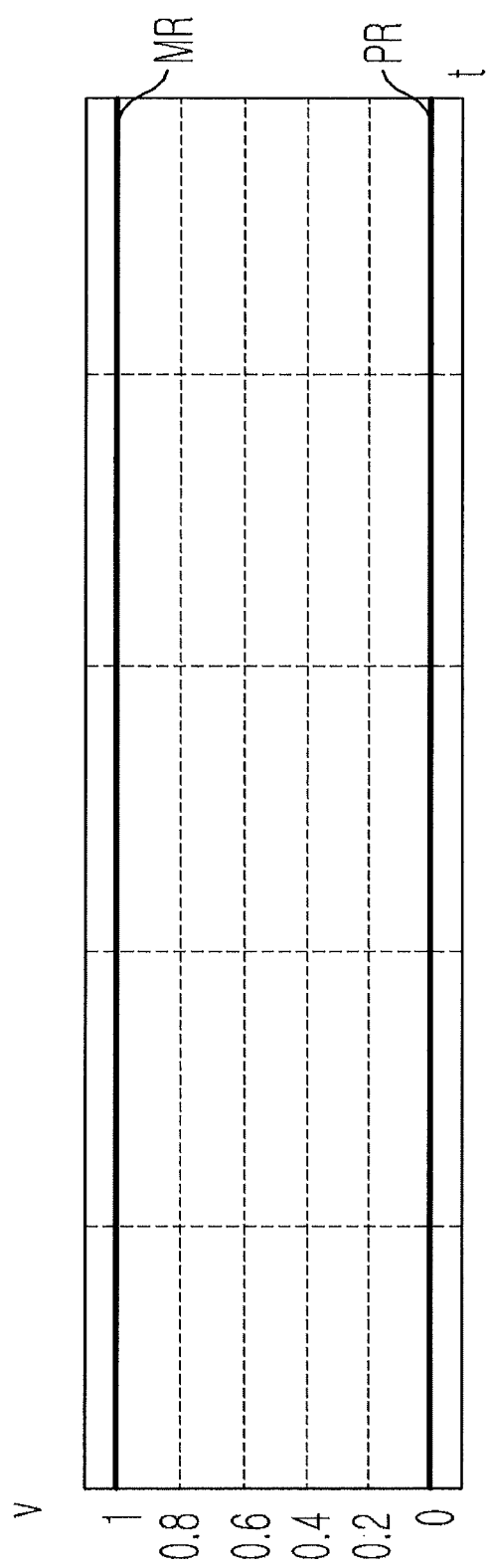
FIGS. 15A and 15B illustrate an output signal graph of a comparison unit at the time of applying a DC power supply having an abnormal polarity to the DC power supply apparatus in accordance with the other embodiment of the present disclosure, and a graph showing a voltage of an input DC power supply and a voltage of a DC link at the time of applying a DC power having an abnormal polarity to the DC power supply apparatus in accordance with the other embodiment of the present disclosure.
Figure 15B:
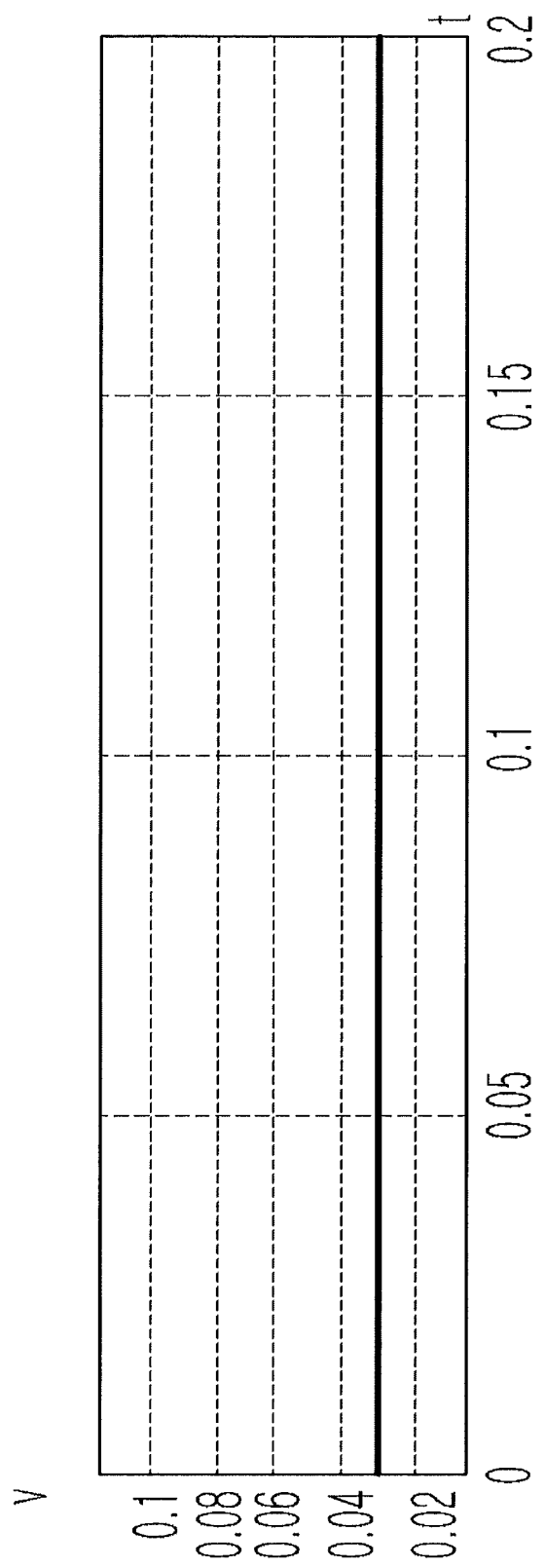

On FIG. 15A, an output signal graph of a comparison unit at the time of applying a DC power supply having an abnormal polarity to the DC power supply apparatus in accordance with the other embodiment of the present disclosure is illustrated, and on FIG. 15B, a graph showing a voltage of an input DC power supply and a voltage of a DC link at the time of applying a DC power having an abnormal polarity to the DC power supply apparatus in accordance with the other embodiment of the present disclosure is illustrated.

As illustrated on FIG. 15A, as a high signal is output from the output (MR: Minus Relay) of the first comparison unit and a low signal is output from the output (PR: Plus Relay) of the second comparison unit, a current is not applied to the coil of the first relay S11 and at the coil of the second relay S12, both of which are operated at the time of the positive (+) voltage is applied, while a current is applied to the coil of the third relay S21 and to the coil of the fourth relay S22, both of which are operated at the time of the negative (−) voltage is applied.

At this time, the voltage Vin of the DC power supply is at about −380V, and the voltage Vc of the DC link which is the voltage of both ends of the capacitor C is about 380V. That is, the DC power supply apparatus is found to have less loss of power. In addition, it is found that the polarity of the DC power supply entered thereto is corrected.

By correcting the polarity of the DC power supply using the diode and then by changing the current flow from flowing through the diode having greater loss factor to flowing through the relay, a loss of power may be reduced.

That is, the loss factor at the relay is significantly low, as the relay enables a current to flow through the armature, which is nearly same as a lead wire, after the contact point is connected.

In addition, by additionally installing the resistor R5, an effect of an initial charging circuit may be attained at the time of the initial correction of the polarity of the DC power supply.

FIGS. 16A to 19B each illustrate a power loss graph of a washing machine applied with the DC power supply apparatus in accordance with the other embodiment of the present disclosure and a power loss graph of a washing machine applied with a conventional DC power supply apparatus.

FIGS. 16A, 17A, 18a and 19A are power loss graphs of a conventional DC power supply apparatus using a bridge diode, and FIGS. 16B, 17B, 18B and 19B are power loss graphs of a DC power supply graph of the embodiment of the present disclosure.

Figure 16B:
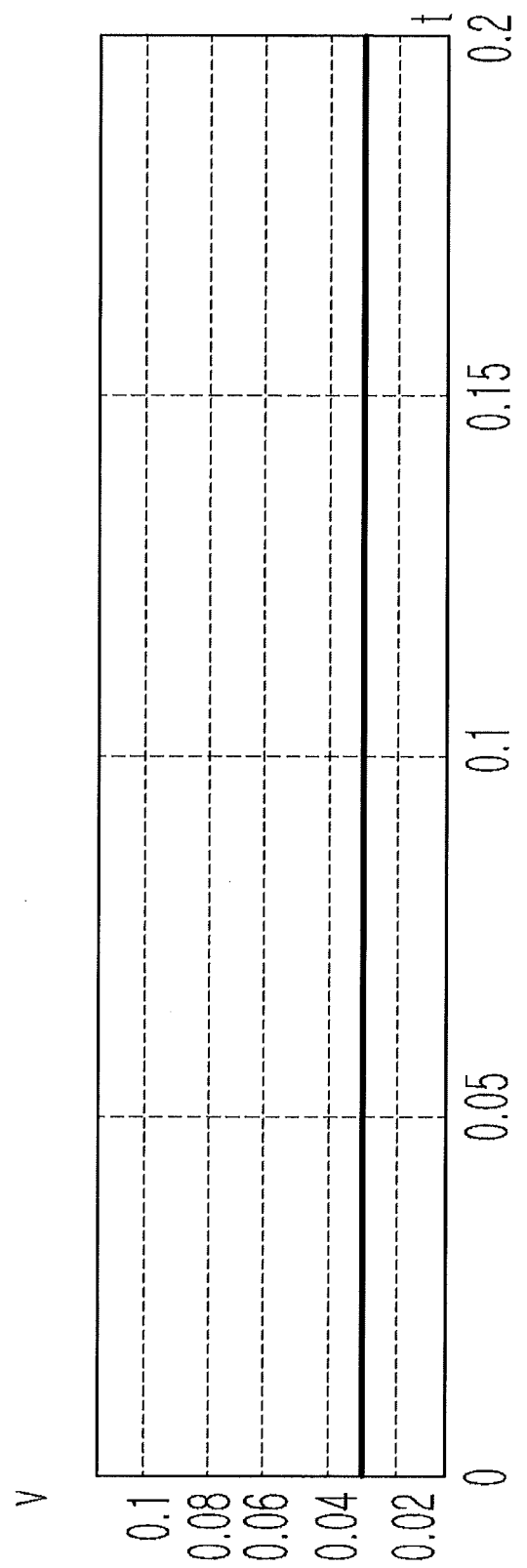

FIGS. 16A and 16B illustrate the power loss graphs at a standby cycle, and the power loss of a conventional drum washing machine is about 1.73 W, and the power loss of the embodiment of the present disclosure is at about 0.03 W.

Figure 17B:
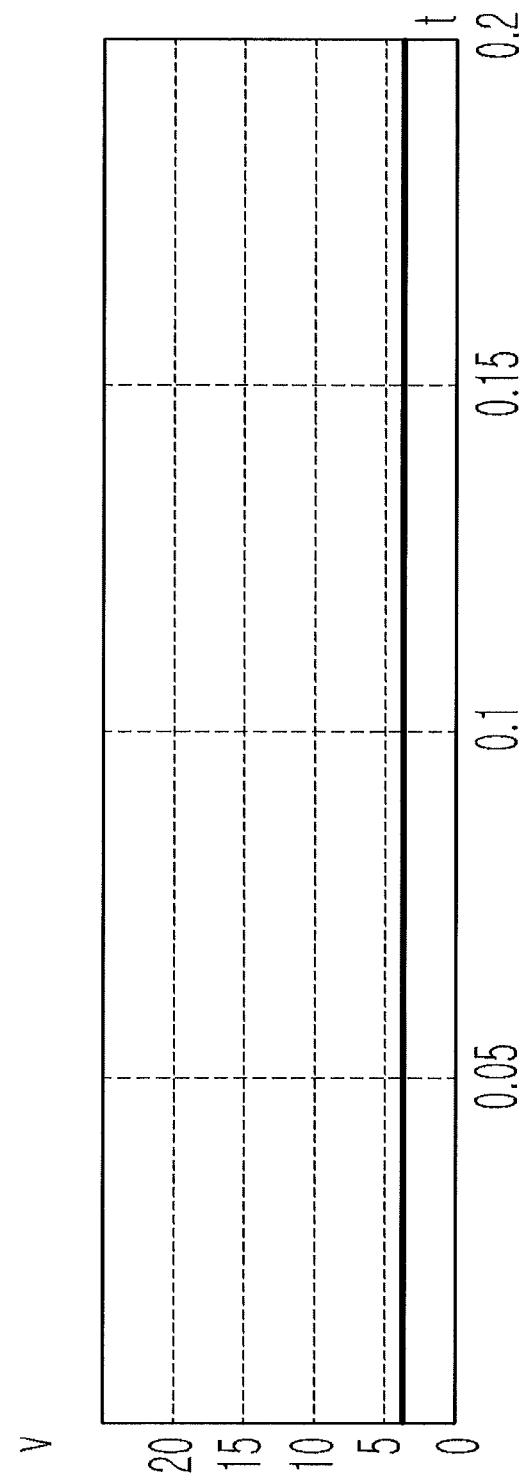

FIGS. 17A and 17B illustrate the power loss graphs at a washing cycle, and the power loss of a conventional drum washing machine is about 19.0 W, and the power loss of the embodiment of the present disclosure is at about 3.77 W.

Figure 18B:
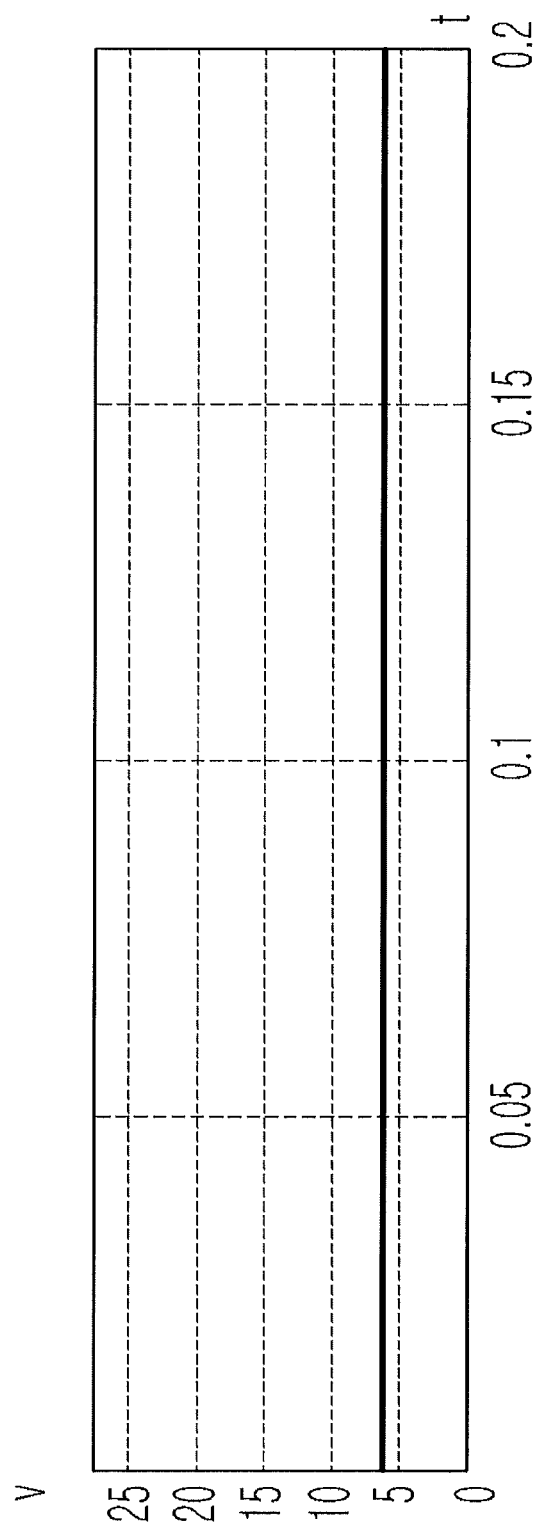

FIGS. 18A and 18B illustrate the power loss graphs at a hot water supply cycle, and the power loss of a conventional drum washing machine is about 25.7 W, and the power loss of the embodiment of the present disclosure is at about 6.86 W.

Figure 19B:
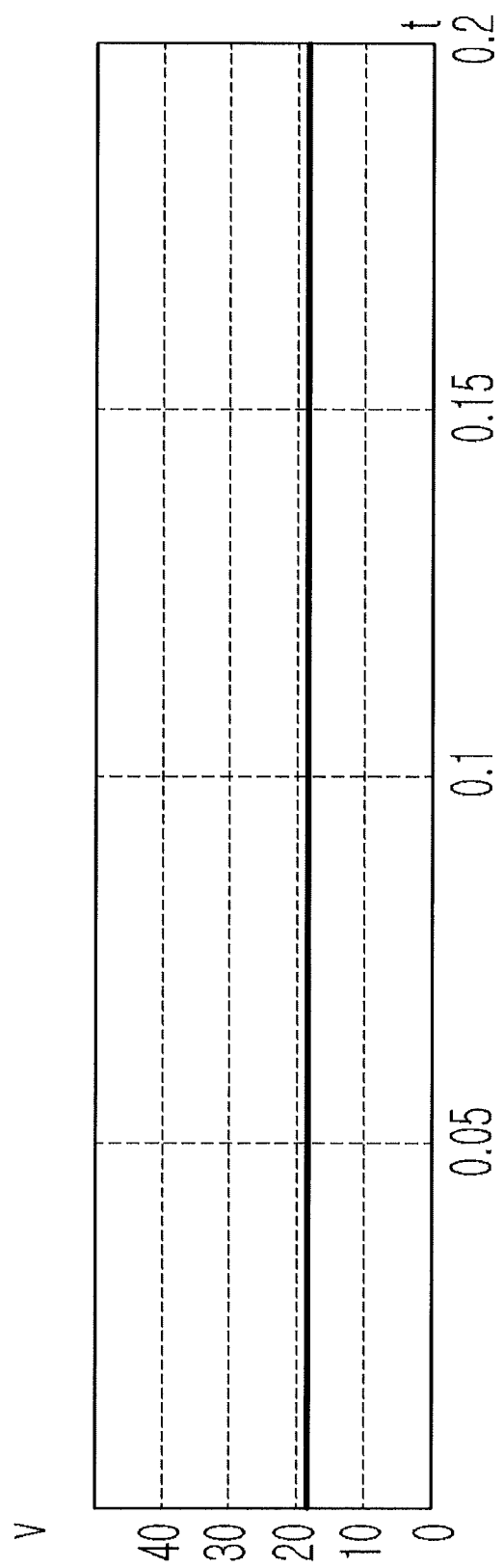

FIGS. 19A and 19B illustrate the power loss graphs at a drying cycle, and the power loss of a conventional drum washing machine is about 42.2 W, and the power loss of the embodiment of the present disclosure is at about 18.4 W.

As described above, the low power loss is provided at the DC power supply apparatus which is configured to correct the polarity by use of the diode and then change the current path by use of the relay in a state when the polarity is corrected, when compared to the DC power supply apparatus which uses only the bridge diode at each operation cycle.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A direct current (DC) power supply apparatus, comprising:
   an input unit configured to receive an outside DC power;
   a plurality of polarity correction units configured to correct the polarity of the outside DC power;
   a plurality of switch units, comprising a plurality of metal-oxide semiconductor field-effect transistors (MOSFET), installed to correspond to each of the plurality of polarity correction units;
   a detection unit configured to detect a flow of current of the plurality of polarity correction unit; and
   a control unit configured to determine a polarity correction unit, at which current of DC power flows, among the plurality of correction units based on a detection signal of transmitted from the detection unit, and control the switch unit corresponding to the determined polarity correction unit at an ON position such that the current of DC power flows through the switch unit which is controlled at the ON position.

2. The DC power supply apparatus of claim 1, wherein:
   the plurality of polarity correction units comprises a plurality of diodes.

3. The DC power supply apparatus of claim 2, wherein:
   the diode is connected in parallel to the MOSFET.

4. The DC power supply apparatus of claim 1, wherein:
   the input unit comprises a first terminal and a second terminal each provided with an input polarity of DC power established.

5. The DC power supply apparatus of claim 4, wherein the plurality of polarity correction units comprises:
   a first polarity correction unit configured to flow current therethrough when the DC powers of the input polarities each established for the first terminal and the second terminal are input into the first terminal and the second terminal, respectively, and
   a second polarity correction unit configured to flow current therethrough when DC powers of input polarities different from the input polarities established for the first terminal and the second terminal are input into the first terminal and the second terminal, respectively.

6. The DC power supply apparatus of claim 5, wherein the plurality of switch units comprises:
   a first switch unit connected in parallel to the first polarity correction unit, and
   a second switch unit connected in parallel to the second polarity correction unit.

7. The DC power supply apparatus of claim 6, wherein the detection unit comprises:
   a first polarity detection unit configured to detect the flow of current of the first polarity correction unit, and
   a second polarity detection unit configured to detect the flow of current of the second polarity correction unit.

8. The DC power supply apparatus of claim 7, wherein:
   the first polarity detection unit comprises a first voltage distribution unit configured to distribute a voltage at both ends of the first polarity correction unit, and a first comparison unit configured to compare the voltage distributed at the first voltage distribution unit with a first reference voltage,
   the second polarity detection unit comprises a second voltage distribution unit configured to distribute a voltage at both ends of the second polarity correction unit, and a second comparison unit configured to compare the voltage distributed at the second voltage distribution unit with a second reference voltage, and the control unit, based on detection signals transmitted from the first comparison unit and the second comparison unit, determines a polarity correction unit, at which current flows, between the first polarity correction unit and the second polarity correction unit.

9. The DC power supply apparatus of claim 8, wherein the control unit is configured to control the first switch unit at ON position if determined that current flows at the first polarity correction unit, and control the second switch unit at ON position if determined that current flows at the second polarity correction unit, thereby changing a current flow from flowing through the first and second polarity correction units to flowing through the first and second switch units.

10. The DC power supply apparatus of claim 1, wherein:
the detection unit comprises a voltage distribution unit connected in parallel to at least one of the plurality of polarity correction units to distribute the voltage of both ends of the at least one polarity correction unit, and a comparison unit configured to compare the distributed voltage with a reference voltage, and
the control unit determines, based on a detection signal transmitted from the comparison unit, a polarity correction unit, at which current flows, among the plurality of polarity correction units.

11. The DC power supply apparatus of claim 10, wherein:
the voltage distribution unit comprises a distribution resistor.

12. The DC power supply apparatus of claim 1, further comprising
a DC link unit configured to smooth a DC power that is corrected at the plurality of polarity correction units.

13. A direct current (DC) power supply apparatus, comprising:
an input unit configured to receive an outside DC power;
a switch unit, comprising a plurality of metal-oxide semiconductor field-effect transistors (MOSFET), connected to the outside DC power and configured to convey the outside DC power to a load;
a polarity correction unit connected in parallel to the switch unit;
a detection unit configured to detect a flow of current of the polarity correction unit; and
a control unit configured to control the switch unit at an ON position such that a flow of current of DC power is changed from flowing through the polarity correction unit to flowing through the switch unit when a detection signal is transmitted from the detection unit.

14. The DC power supply apparatus of claim 13, wherein:
the plurality of polarity correction units comprises a plurality of diodes, and
each of the plurality of diodes is connected in parallel to each of the plurality of the MOSFETs.

15. The DC power supply apparatus of claim 13, wherein:
the polarity correction unit comprises a first polarity correction unit configured to flow current therethrough when DC powers of input polarities each established for a first terminal and a second terminal of the input unit are input to the first terminal and the second terminal, respectively, and a second polarity correction unit configured to flow current therethrough when DC powers of input polarities different from the input polarities each established for the first terminal and the second terminal are input into the first terminal and the second terminal, respectively,
the detection unit comprises a first polarity detection unit configured to detect a current flow of the first polarity correction unit and a second polarity detection unit configured to detect a current flow of the second polarity correction unit, the plurality of switch units comprises a first switch unit connected in parallel to the first polarity correction unit and a second switch unit connected in parallel to the second polarity correction unit, and
the control unit controls a first switch unit corresponding to the first polarity correction unit at the ON position when a detection signal is transmitted from the first polarity detection unit, and controls a second switch unit corresponding to the second polarity correction unit at ON position when a detection signal is transmitted from the second polarity detection unit.

16. The DC power supply apparatus of claim 15, wherein:
the first polarity detection unit comprises a first voltage distribution unit configured to distribute a voltage at both ends of the first polarity correction unit, and a first comparison unit configured to compare the voltage distributed from the first voltage distribution unit with a first reference voltage, and
the second polarity detection unit comprises a second voltage distribution unit configured to distribute a voltage at both ends of the second polarity correction unit, and a second comparison unit configured to compare the voltage distributed from the second voltage distribution unit with a second reference voltage.

17. A direct current (DC) power supply apparatus, comprising:
an input unit comprising a first terminal and a second terminal each having an input polarity thereof established, the input unit configured to receive an outside DC power through the first terminal and the second terminal;
a polarity correction unit configured, if DC powers of input polarities each established for the first terminal and the second terminal are input into the first terminal and the second terminal, to form a first current path between the DC power of outside and a load, and if DC powers of input polarities different from the input polarities each established for the first terminal and the second terminal are input into the first terminal and the second terminal, configured to form a second current path between the DC power of outside and the load such that the input polarity of the DC power is corrected;
a plurality of switch units provided on the first current path and the second current path and configured to convey the DC power of outside to the load;
a detection unit configured to detect a path of current of each of the first current path and the second current path; and
a control unit, based on a signal transmitted from the detection unit, configured to determine a current path between the first current path and the second current path, which is formed, and configured to change a flow of current from flowing through the polarity correction unit to flowing from the switch unit by controlling the switch unit, which is positioned at the determined current path at an ON position.

* * * * *